(12) United States Patent
Yogo et al.

(10) Patent No.: US 12,174,614 B2
(45) Date of Patent: Dec. 24, 2024

(54) CONTROL PROGRAM GENERATION APPARATUS, CONTROL PROGRAM GENERATION METHOD, AND PROGRAM

(71) Applicant: OPTON Co. LTD., Aichi (JP)

(72) Inventors: Teruaki Yogo, Aichi (JP); Hideyuki Tanaka, Aichi (JP); Toshihiro Kani, Aichi (JP); Hidenori Ozaki, Aichi (JP)

(73) Assignee: OPTON Co. LTD., Aichi (JP)

( * ) Notice: Subject to any disclaimer, the term of this patent is extended or adjusted under 35 U.S.C. 154(b) by 423 days.

(21) Appl. No.: 17/852,009

(22) Filed: Jun. 28, 2022

(65) Prior Publication Data

US 2022/0326688 A1 Oct. 13, 2022

Related U.S. Application Data

(63) Continuation of application No. PCT/JP2021/002590, filed on Jan. 26, 2021.

(30) Foreign Application Priority Data

Jan. 28, 2020 (JP) .................................. 2020-011386
Apr. 20, 2020 (JP) .................................. 2020-075017

(Continued)

(51) Int. Cl.
*G05B 19/4155* (2006.01)

(52) U.S. Cl.
CPC ............ *G05B 19/4155* (2013.01); *G05B 2219/31368* (2013.01); *G05B 2219/35216* (2013.01)

(58) Field of Classification Search
None
See application file for complete search history.

(56) References Cited

U.S. PATENT DOCUMENTS 5,122,717 A 6/1992 Hayashi
6,701,497 B1 3/2004 Ohkubo
(Continued)

FOREIGN PATENT DOCUMENTS

JP H3-154105 A 7/1991
JP H11-202912 A 7/1999
(Continued)

OTHER PUBLICATIONS

International Search Report issued in PCT/JP2021/002590 mailed on Apr. 13, 2021 with English Translation pages).
(Continued)

*Primary Examiner* — Ryan A Jarrett
(74) *Attorney, Agent, or Firm* — Nakanishi IP Associates, LLC

(57) ABSTRACT

An action chart describing an operation of an automated manufacturing machine includes subperiods into which an operation period from a start to an end of the operation of the automated manufacturing machine is divided. The action chart includes element actions included in the operation of the automated manufacturing machine. The element actions on the action chart are assigned to the subperiods and each include an action identifier including qualitative information about the element action, and a numerical table or numerical parameters. The action chart is read. The action identifiers on the action chart are converted into program elements stored in a manner associated with the action identifiers. A numerical value in the numerical table or the numerical parameters is set for each program element. The program elements are combined together in an order of the subperiods on the action chart.

6 Claims, 18 Drawing Sheets

(30) Foreign Application Priority Data

Apr. 30, 2020 (JP) ................................ 2020-080857
Jan. 19, 2021 (JP) ................................ 2021-006778
Jan. 25, 2021 (JP) ................................ 2021-009660

(56) References Cited

U.S. PATENT DOCUMENTS

2013/0338797 A1* 12/2013 Nagata .................. G05B 15/02
                                                          700/9
2016/0231733 A1    8/2016 Nagatani et al.

FOREIGN PATENT DOCUMENTS

| JP | 2000-259216 A | 9/2000 |
| JP | 2001-101258 A | 4/2001 |
| JP | 2003-228403 A | 8/2003 |
| JP | 2003-281210 A | 10/2003 |
| JP | 2011-245602 A | 12/2011 |
| JP | 2018-185772 A | 11/2018 |
| JP | 2018-192570 A | 12/2018 |
| WO | 2015/063925 A1 | 5/2015 |

OTHER PUBLICATIONS

Written Opinion of International Searching Authority issued in PCT/JP2021/002590 mailed on Apr. 13, 2021 with English Translation (7 pages).

Office Action issued in Japanese Patent Application No. 2020-011386 mailed on May 12, 2020, with English Translation (8 pages).

Office Action issued in Japanese Patent Application No. 2020-075017 mailed on Nov. 24, 2020, with English Translation (8 pages).

Office Action issued in Japanese Patent Application No. 2021-009660 mailed on Mar. 8, 2022, with English Translation (4 pages).

* cited by examiner

FIG. 3
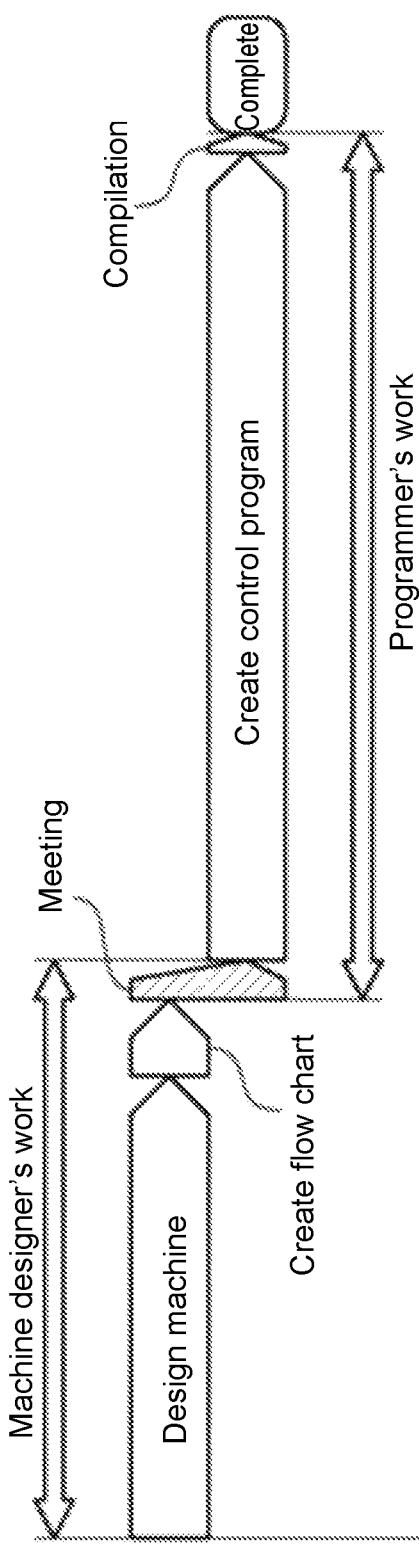
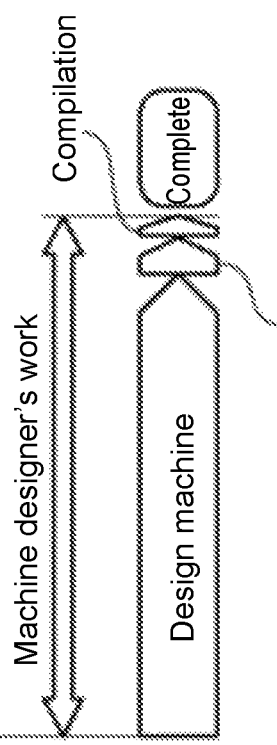

FIG. 4A
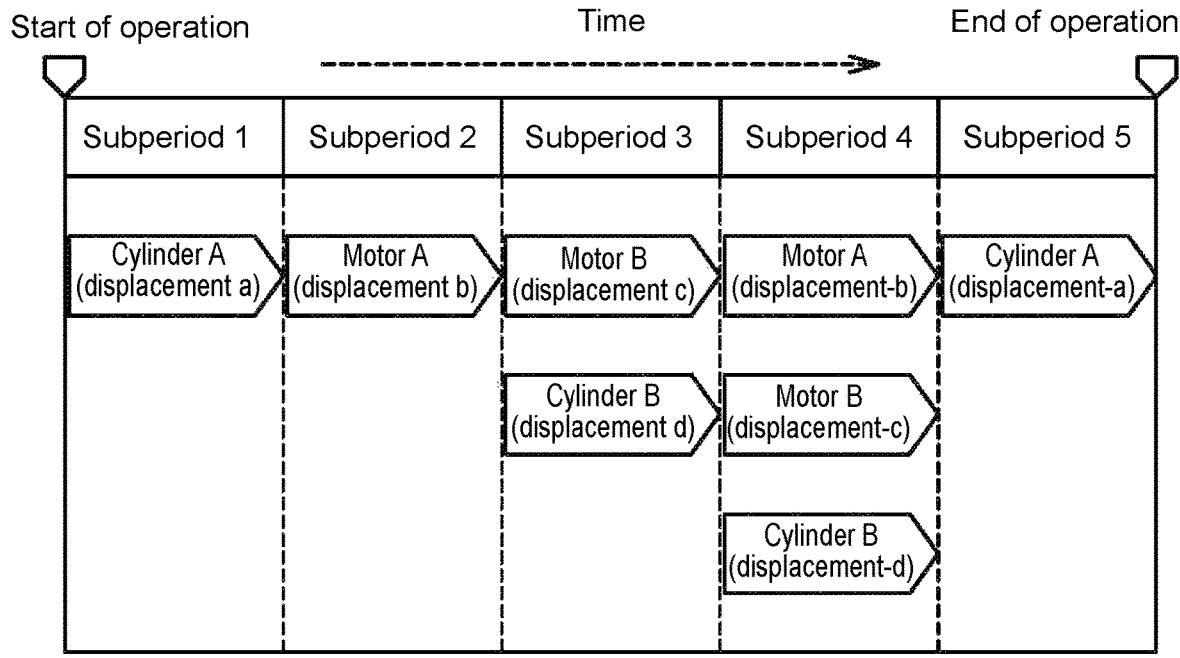
FIG. 4B
| Actuator (Element action) | Program element |
|---|---|
| Motor A | prog1 |
| Motor B | prog2 |
| Cylinder A | prog3 |
| Cylinder B | prog4 |
FIG. 4C
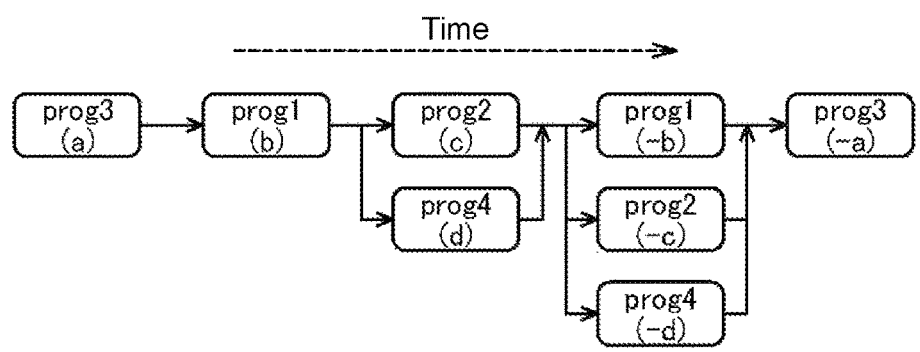

FIG. 6

| Action identifier | Actuator | Action | Program element number |
|---|---|---|---|
| Ω-AA | AC servomotor + chuck unit | Opening or closing motion | 3 |
| Ω-AB | AC servomotor + reducer | Rotation motion | 7 |
| Ω-AC | AC servomotor + ball screw unit | Forward or backward motion | 4 |
| Ω-CA | Air cylinder | Forward or backward motion | 2 |

| | |
|---|---|
| Numerical table number | 5 |
| Opening-closing speed (mm/s) | 20 |
| Opening-closing load (N) | 15 |
| Lookup table | AA-A01 |

| | |
|---|---|
| Numerical table number | 6 |
| Opening-closing speed (mm/s) | -30 |
| Opening-closing load (N) | 5 |
| Lookup table | AA-A02 |

| | |
|---|---|
| Numerical table number | 10 |
| Rotation angle (deg) | 90 |
| Rotation speed (deg/s) | 10 |
| Torque (Nm) | 15 |
| Lookup table | AB-A01 |

| | |
|---|---|
| Numerical table number | 11 |
| Rotation angle (deg) | -90 |
| Rotation speed (deg/s) | 10 |
| Torque (Nm) | 15 |
| Lookup table | AB-A02 |

| | |
|---|---|
| Numerical table number | 17 |
| Movement distance (mm) | 46 |
| Movement speed (mm/s) | 5 |
| Movement load (N) | 12 |
| Lookup table | AC-A01 |

| | |
|---|---|
| Numerical table number | 18 |
| Movement distance (mm) | -46 |
| Movement speed (mm/s) | 5 |
| Movement load (N) | 12 |
| Lookup table | AC-A02 |

| | |
|---|---|
| Numerical table number | 19 |
| Movement distance (mm) | 46 |
| Movement speed (mm/s) | 5 |
| Movement load (N) | 12 |
| Lookup table | AC-A11 |

| | |
|---|---|
| Numerical table number | 20 |
| Movement distance (mm) | -46 |
| Movement speed (mm/s) | 5 |
| Movement load (N) | 12 |
| Lookup table | AC-A12 |

| | |
|---|---|
| Numerical table number | 8 |
| Movement distance (mm) | 105 |
| Movement speed (mm/s) | 5 |
| Movement load (N) | 10 |
| Lookup table | AC-A21 |

| | |
|---|---|
| Numerical table number | 9 |
| Movement distance (mm) | -105 |
| Movement speed (mm/s) | 5 |
| Movement load (N) | 10 |
| Lookup table | AC-A22 |

| | | | |
|---|---|---|---|
| Maximum speed (mm/s) | 60 | Standard value of opening-closing speed (mm/s) | 5 |
| Maximum load (N) | 50 | Standard value of opening-closing load (N) | 5 |
| Reduction ratio of chuck unit | 1/12.5 | | |
| Possible diameter range for chuck unit | 10~75 | | |

| | | | |
|---|---|---|---|
| Maximum speed (mm/s) | -60 | Standard value of opening-closing speed (mm/s) | -10 |
| Maximum load (N) | 50 | Standard value of opening-closing load (N) | 5 |
| Reduction ratio of chuck unit | 1/12.5 | | |
| Possible diameter range for chuck unit | 10~75 | | |

| | | | |
|---|---|---|---|
| Angular range (deg) | ±180 | Standard value of rotation angle (deg) | 90 |
| Maximum rotation speed (deg/s) | 50 | Standard value of rotation speed (deg/s) | 10 |
| Maximum torque (Nm) | 50 | Standard value of torque (Nm) | 5 |
| Reduction ratio | 1/10.0 | | |

| | | | |
|---|---|---|---|
| Angular range (deg) | ±180 | Standard value of rotation angle (deg) | -90 |
| Maximum rotation speed (deg/s) | 50 | Standard value of rotation speed (deg/s) | 10 |
| Maximum torque (Nm) | 50 | Standard value of torque (Nm) | 5 |
| Reduction ratio | 1/10.0 | | |

| Movable range (mm) | 0~500 | Standard value of movement distance (mm) | 100 |
|---|---|---|---|
| Maximum movement speed (mm/s) | 50 | Standard value of movement speed (mm/s) | 10 |
| Maximum movement load (N) | 50 | Standard value of movement load (N) | 5 |
| Reduction ratio | 1/10.0 | | |
| Screw pitch | 0.5 | | |

| Movable range (mm) | 0~500 | Standard value of movement distance (mm) | 100 |
|---|---|---|---|
| Maximum movement speed (mm/s) | 50 | Standard value of movement speed (mm/s) | 10 |
| Maximum movement load (N) | 50 | Standard value of movement load (N) | 5 |
| Reduction ratio | 1/10.0 | | |
| Screw pitch | 0.5 | | |

| Movable range (mm) | 0~350 | Standard value of movement distance (mm) | 100 |
|---|---|---|---|
| Maximum movement speed (mm/s) | 30 | Standard value of movement speed (mm/s) | 10 |
| Maximum movement load (N) | 100 | Standard value of movement load (N) | 5 |
| Reduction ratio | 1/12.0 | | |
| Screw pitch | 0.4 | | |

AC-A22

AC-A21

| Maximum movement load (N) | 110 | Standard value of movement load (N) | 6 |
|---|---|---|---|
| Reduction ratio | 1/11.0 | | |
| Screw pitch | 0.6 | | |

FIG. 14

| Actuator | Structure of actuator | Action | Action identifier | Program element number |
|---|---|---|---|---|
| Actuator 10 | AC servomotor + chuck unit | Opening or closing motion | Ω-AA | 3 |
| Actuator 11 | AC servomotor + reducer | Rotation motion | Ω-AB | 7 |
| Actuator 12 | AC servomotor + ball screw unit | Forward or backward motion | Ω-AC | 4 |
| Actuator 13 | AC servomotor + ball screw unit | Forward or backward motion | Ω-AC | 4 |
| Actuator 14 | Air cylinder | Forward or backward motion | Ω-CA | 2 |
| Actuator 15 | Air cylinder | Forward or backward motion | Ω-CA | 2 |
| Actuator 16 | Air cylinder | Forward or backward motion | Ω-CA | 2 |
| Actuator 17 | AC servomotor + ball screw unit | Forward or backward motion | Ω-AC | 4 |
| Actuator 18 | AC servomotor + reducer | Rotation motion | Ω-AB | 7 |
| | | | Ω-AD | 8 |
| Actuator 19 | AC servomotor + reducer | Rotation motion | Ω-AB | 7 |
| | | | Ω-AD | 8 |
| Actuator 20 | AC servomotor + ball screw unit | Forward or backward motion | Ω-AC | 4 |

FIG. 17

Intermediate data

Control program

```
 1: (1, 4, 4, 19),
 2: (2, 2, 7, 10),
 3: (3, 3, 4, 17),
 4: (4, 1, 3, 5),
 5: (5, 5, 2), (5, 6, 2), (5, 7, 2),
 6: (6, 1, 3, 6), (6, 8, 4, 8),
 7: (7, 3, 4, 18),
 8: (8, 2, 7, 11), (8, 8, 4, 9),
 9: (9, 4, 4, 20),
10: (10, 1, 3, 5), (10, 5, 2), (10, 6, 2), ···
```

FIG. 21A
AA-B01
| Numerical table number | 5 |
|---|---|
| Opening-closing speed (mm/s) | 20 |
| Opening-closing torque (Nm) | 15 |
| Action wait time (s) | 5 |
| Lookup table | AA-A01 |
FIG. 21B
AA-B05
| Numerical table number | 9 |
|---|---|
| Opening-closing speed (mm/s) | 30 |
| Opening-closing torque (Nm) | 5 |
| Action wait time (s) | 0 |
| Lookup table | AA-A01 |
FIG. 22A
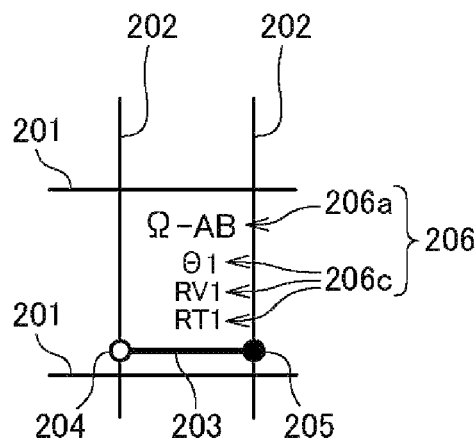
FIG. 22B
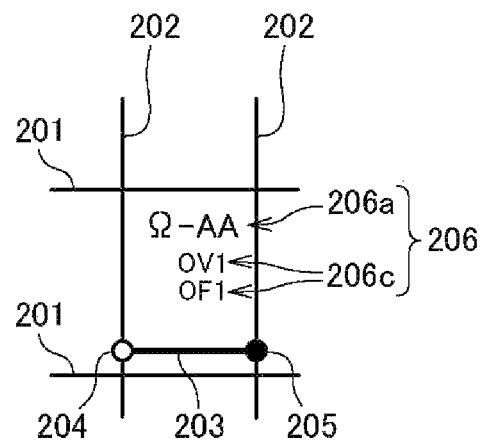

AC-B11

| | |
|---|---|
| Numerical table number | 19 |
| Movement distance (mm) | 46 |
| Subsequent-action permission position (mm) | -5 |
| Movement speed (mm/s) | 5 |
| Movement load (N) | 12 |
| Lookup table | AC-A11 |

CONTROL PROGRAM GENERATION APPARATUS, CONTROL PROGRAM GENERATION METHOD, AND PROGRAM

CROSS-REFERENCE TO RELATED APPLICATIONS

This application is a continuation application of International Patent Application No. PCT/JP2021/002590 filed on Jan. 26, 2021, which claims priority to Japanese Patent Application No. 2020-011386 filed on Jan. 28, 2020, Japanese Patent Application No. 2020-075017 filed on Apr. 20, 2020, Japanese Patent Application No. 2020-080857 filed on Apr. 30, 2020, Japanese Patent Application No. 2021-006778 filed on Jan. 19, 2021, and Japanese Patent Application No. 2021-009660 filed on Jan. 25, 2021, the entire contents of which are incorporated by reference.

BACKGROUND OF INVENTION

Field of the Invention

The present invention relates to a technique for generating a control program for an automated manufacturing machine including multiple actuators.

Background Art

Labor savings at manufacturing sites such as factories have recently been in focus across many industries. Such labor savings may be achieved using automated manufacturing machines. Various automated manufacturing machines have been developed depending on an object to be machined or manufactured and the type of machining (e.g., cutting or bending) (refer to, for example, Patent Literatures 1 and 2).

The size, shape, or material of objects to be manufactured or the details or conditions for machining typically differ at each manufacturing site. An automated manufacturing machine used at one manufacturing site cannot be easily introduced to another manufacturing site. Thus, an automated manufacturing machine dedicated to each manufacturing site is to be developed. Developing a dedicated automated manufacturing machine involves newly developing a control program for controlling the automated manufacturing machine.

Developing the control program involves an engineer expert in software (programmer). Further, the programmer cannot start developing the control program until the design of the automated manufacturing machine is fixed to a certain degree. Developing the automated manufacturing machine thus takes a long time including the development period for the control program. This may obstruct active introduction of an automated manufacturing machine to a manufacturing site.

The inventor of the present application and others have developed a technique that responds to the above issue, with which the operation of the automated manufacturing machine is written on a special action chart to automatically generate the control program using the action chart. A patent application has been filed for this technique (Japanese Patent Application No. 2020-075017). The special action chart uniquely developed by the inventor of the present application may be hereafter referred to as a YOGO chart. The action chart (YOGO chart) can be easily created by anyone with knowledge about the operation of the automated manufacturing machine and can be used to automatically generate the control program. This technique greatly reduces the time taken to develop a new automated manufacturing machine and also eliminates the work to be performed by the programmer, thus reducing the manufacturing costs.

CITATION LIST

Patent Literature

Patent Literature 1: Japanese Unexamined Patent Application Publication No. 2011-245602
Patent Literature 2: Japanese Unexamined Patent Application Publication No. 2018-192570

SUMMARY OF INVENTION

Technical Problem

However, any error in information written on the action chart (YOGO chart) describing the operation of the automated manufacturing machine with the above patent-pending technique can disable the automated manufacturing machine from operating as intended. A technique is to be developed for minimizing errors in information written on the action chart (YOGO chart) describing the operation of the automated manufacturing machine.

In response to the above issue with the known technique, one or more aspects of the present invention are directed to a technique for reducing errors in information written on the action chart (YOGO chart) describing the operation of the automated manufacturing machine.

Solution to Problem

In response to the above issue, a control program generation apparatus according to one or more aspects of the present invention is an apparatus described below.

The apparatus is specifically a control program generation apparatus (100a, 110) for generating a control program for an automated manufacturing machine (1) including a plurality of actuators (10 to 20). The apparatus (100a, 110) includes an element action storage (102), an action chart reader (103), and a control program generator (105). The element action storage (102) stores a plurality of element actions (206) each indicating an action with an inherent degree of freedom of a corresponding actuator of the plurality of actuators. The plurality of element actions (206) are associated with a plurality of program elements to perform the plurality of element actions (206). The action chart reader (103) reads an action chart (200) describing an operation of the automated manufacturing machine. The action chart (200) includes a plurality of subperiods into which an operation period from a start to an end of the operation of the automated manufacturing machine is divided. The action chart (200) includes the plurality of element actions included in the operation of the automated manufacturing machine. The plurality of element actions are assigned to the plurality of subperiods. The control program generator (105) generates the control program to cause the automated manufacturing machine to operate by combining together, in an order of the plurality of subperiods on the action chart, the plurality of program elements for the plurality of element actions assigned to the plurality of subperiods on the action chart. Each of the plurality of element actions includes an action identifier (206a) and a numerical identifier. The action identifier (206a) includes qualitative information about the element action without numerical quantitative information about the element action. The numerical identifier includes numerical quantitative information about the element action. The element action storage stores the plurality of program elements each corresponding to the action identifier of a corresponding element action of the plurality of element actions and stores a numerical table (206b) corresponding to the numerical identifier or a plurality of numerical parameters (206c) corresponding to the numerical identifier. The action chart reader reads the action chart describing the plurality of element actions each including the action identifier and the numerical table or the plurality of numerical parameters. The control program generator sets a numerical value for each of the plurality of program elements in accordance with the numerical table or the plurality of numerical parameters described with the action identifier corresponding to the program element, and combines the plurality of program elements together.

A control program generation method according to one or more aspects of the present invention corresponding to the above control program generation apparatus is a method described below.

The method is specifically a control program generation method for generating, with a computer, a control program for an automated manufacturing machine (1) including a plurality of actuators (10 to 20). The method includes reading (STEP 1) an action chart (200), analyzing (STEP 2) the action chart, and generating (STEP 3) the control program. The action chart (200) describes an operation of the automated manufacturing machine. The action chart (200) includes a plurality of subperiods into which an operation period from a start to an end of the operation of the automated manufacturing machine is divided. The action chart (200) includes a plurality of element actions (206) included in the operation of the automated manufacturing machine. Each of the plurality of element actions (206) indicates an action with an inherent degree of freedom of a corresponding actuator of the plurality of actuators. The plurality of element actions are assigned to the plurality of subperiods. The analyzing (STEP 2) the action chart includes analyzing (STEP 2) the action chart to extract, from the action chart, the plurality of element actions and the plurality of subperiods assigned with the plurality of element actions. The generating (STEP 3) the control program includes generating (STEP 3) the control program to cause the automated manufacturing machine to operate by combining together, in an order of the plurality of subperiods assigned with the plurality of element actions on the action chart, a plurality of program elements to perform the plurality of element actions. The reading the action chart includes reading the action chart describing the plurality of element actions each including an action identifier (206a) and a numerical table (206b) or a plurality of numerical parameters (206c). The action identifier (206a) includes qualitative information about the element action without numerical quantitative information about the element action. The numerical table (206b) or the plurality of numerical parameters (206c) include numerical quantitative information about the element action. The generating the control program includes referring to a stored correspondence between the action identifier of each of the plurality of element actions and a program element of the plurality of program elements to perform the action identifier, converting the action identifier into the program element, setting a numerical value for each of the plurality of program elements in accordance with the numerical table or the plurality of numerical parameters described with the action identifier, and combining together the plurality of program elements in an order of the plurality of subperiods on the action chart.

In the control program generation apparatus and the control program generation method according to the above aspects of the present invention, the operation of the automated manufacturing machine is pre-described on the action chart below. The action chart includes the subperiods into which the operation period from the start to the end of the operation of the automated manufacturing machine is divided. The action chart also includes the element actions of the actuators included in the operation of the automated manufacturing machine. The element actions are assigned to the subperiods to describe the operation of the automated manufacturing machine. Each element action on the action chart includes an action identifier and a numerical table or multiple numerical parameters. The action identifier includes qualitative information about the element action without numerical quantitative information about the element action. The numerical table or the numerical parameters include numerical quantitative information about the element action. Each action identifier is prestored in a manner associated with the program element to perform the action indicated by the action identifier. The action chart describing the operation of the automated manufacturing machine is read. The action identifiers of the element actions on the action chart are converted into program elements. A numerical value included in the numerical table or the numerical parameters described with the corresponding action identifier is set for each program element to generate the control program for the automated manufacturing machine. The program elements are combined together in an order of the subperiods to generate the control program on the action chart.

The action identifiers include qualitative information about simple element actions of the actuators without numerical quantitative information about the element actions. The program elements to cause the actuators to perform the actions indicated by the action identifiers can be pre-created. To cause the actuators to act using the program elements, the program elements are to include quantitative information such as the displacement or the action speed. Numerical values of such information are included in the numerical table or the numerical parameters prepared separately from the action identifiers. Such an action chart can be created easily by the machine designer who has designed the automated manufacturing machine or an engineer with sufficient knowledge about the structure of the automated manufacturing machine. The created action chart is read. The action identifiers on the action chart are converted into program elements. A numerical value is set for each program element in accordance with the numerical table described with the corresponding action identifier. The program elements are combined together in accordance with the action chart to automatically generate the control program for controlling the operation of the automated manufacturing machine. The action chart describes each element action using the action identifier and the numerical table or the numerical parameters. This greatly reduces errors in information written on the action chart (YOGO chart) for the reasons below. The action identifiers are simply an engineer's intuitive expressions of the actions of actuators. The work of writing the action identifiers on the action chart simply involves the work of intuitively expressing the engineer's intention. The engineer is thus much less likely to write erroneous action identifiers on the chart. The action identifiers alone do not indicate specific numerical values and thus cannot cause actuators to act. The specific numerical values can be obtained from the numerical table or the numerical parameters. The specific numerical values included in the numerical table or the numerical parameters can be corrected without correcting the action chart. This avoids inappropriate correction of the action chart, thus greatly reducing errors in information written on the action chart (YOGO chart).

In the control program generation apparatus according to the above aspect of the present invention, the numerical table or the numerical parameters may include multiple numerical values indicating at least one of a displacement, an action speed, or an action load for an element action.

Numerical values indicating, for example, the displacement, the action speed, or the action load for the element action of each actuator are used to cause the actuator to perform the element action as intended. However, such numerical values cannot be indicated by an action identifier. The numerical values may be included in the numerical table or the numerical parameters to allow the actuator to perform the element action as intended. This allows the automated manufacturing machine to operate appropriately.

In the control program generation apparatus according to the above aspect of the present invention, a lookup table including an appropriate preset numerical value may be referred to when the numerical table includes no numerical value.

The numerical value included in the lookup table can be used to cause the actuator to act without the numerical table including the preset numerical value. An appropriate numerical value can be added later to the numerical table as appropriate to allow the automated manufacturing machine to operate appropriately.

In the control program generation apparatus according to the above aspect of the present invention, the numerical table or the numerical parameters may include an action wait time to wait before a start of an element action.

The numerical table or the numerical parameters including the action wait time allow the actuator to perform the element action after the action wait time elapses. To cause multiple actuators to perform their element actions, the action wait time included in the numerical table or the numerical parameters can be adjusted for each actuator. This allows easy description of finely adjusted actions, such as causing the actuators to start the element actions at slightly different times.

The above control program generation method according to one or more aspects of the present invention may also be implemented as a program for causing a computer to perform the control program generation method. The program according to one or more aspects of the present invention is specifically a non-transitory computer-readable storage medium storing a program for causing a computer to implement a method for generating a control program for an automated manufacturing machine (1) including a plurality of actuators (10 to 20). The program causes the computer to perform actions including reading (STEP 1) an action chart (200), analyzing (STEP 2) the action chart, and generating (STEP 3) the control program. The action chart (200) describes an operation of the automated manufacturing machine. The action chart (200) includes a plurality of subperiods into which an operation period from a start to an end of the operation of the automated manufacturing machine is divided. The action chart (200) includes a plurality of element actions (206) included in the operation of the automated manufacturing machine. Each of the plurality of element actions (206) indicates an action with an inherent degree of freedom of a corresponding actuator of the plurality of actuators. The plurality of element actions are assigned to the plurality of subperiods. The analyzing (STEP 2) the action chart includes analyzing (STEP 2) the action chart to extract, from the action chart, the plurality of element actions and the plurality of subperiods assigned with the plurality of element actions. The generating (STEP 3) the control program includes generating (STEP 3) the control program to cause the automated manufacturing machine to operate by combining together, in an order of the plurality of subperiods assigned with the plurality of element actions on the action chart, a plurality of program elements to perform the plurality of element actions. The reading the action chart includes reading the action chart describing the plurality of element actions each including an action identifier (206a) and a numerical table (206b) or a plurality of numerical parameters (206c). The action identifier (206a) includes qualitative information about the element action without numerical quantitative information about the element action. The numerical table (206b) or the plurality of numerical parameters (206c) include numerical quantitative information about the element action. The generating the control program includes referring to a stored correspondence between the action identifier of each of the plurality of element actions and a program element of the plurality of program elements to perform the action identifier, converting the action identifier into the program element, setting a numerical value for each of the plurality of program elements in accordance with the numerical table or the plurality of numerical parameters described with the action identifier, and combining together the plurality of program elements in an order of the plurality of subperiods on the action chart.

The program can be loaded and executed by the computer to automatically generate the control program for controlling the operation of the automated manufacturing machine from the action chart. The technique also reduces errors in information written on the action chart.

BRIEF DESCRIPTION OF THE DRAWINGS

FIG. 3 shows conceptual diagrams showing general processes for developing a new automated manufacturing machine 1.

FIGS. 4A, 4B, and 4C are diagrams showing the basic principle of automatically generating a control program for the automated manufacturing machine 1 from an action chart (YOGO chart) with the control apparatus 100 for the automated manufacturing machine according to the present embodiment.

FIG. 6 is a table showing action identifiers 206a for element actions.

FIGS. 7A and 7B are example numerical tables 206b each combined with the action identifier 206a (Ω-AA).

FIGS. 8A and 8B are example numerical tables 206b each combined with the action identifier 206a (Ω-AB).

FIGS. 9A, 9B, 9C, 9D, 9E, and 9F are example numerical tables 206b for the action identifier 206a (Ω-AC).

FIGS. 10A and 10B are example lookup tables for the numerical tables 206b for the action identifier 206a (Ω-AA).

FIGS. 11A and 11B are example lookup tables for the numerical tables 206b for the action identifier 206a (Ω-AB).

FIGS. 12A to 12C are example lookup tables for the numerical tables 206b for the action identifier 206a (Ω-AC).

FIG. 14 is a table including the actuators, the action identifiers 206a, and program element numbers stored in a manner associated with one another in an element action storage 102 in the present embodiment.

FIG. 17 is a diagram of example intermediate data resulting from the YOGO chart analysis process.

FIG. 18 is a diagram of an example control program resulting from conversion of the intermediate data.

FIGS. 21A and 21B are example numerical tables 206b including the action wait time.

FIGS. 22A and 22B are diagrams showing example element actions 206 each described using multiple numerical parameters 206c instead of the numerical tables 206b.

DETAILED DESCRIPTION

A. Apparatus Structure

Figure 1:
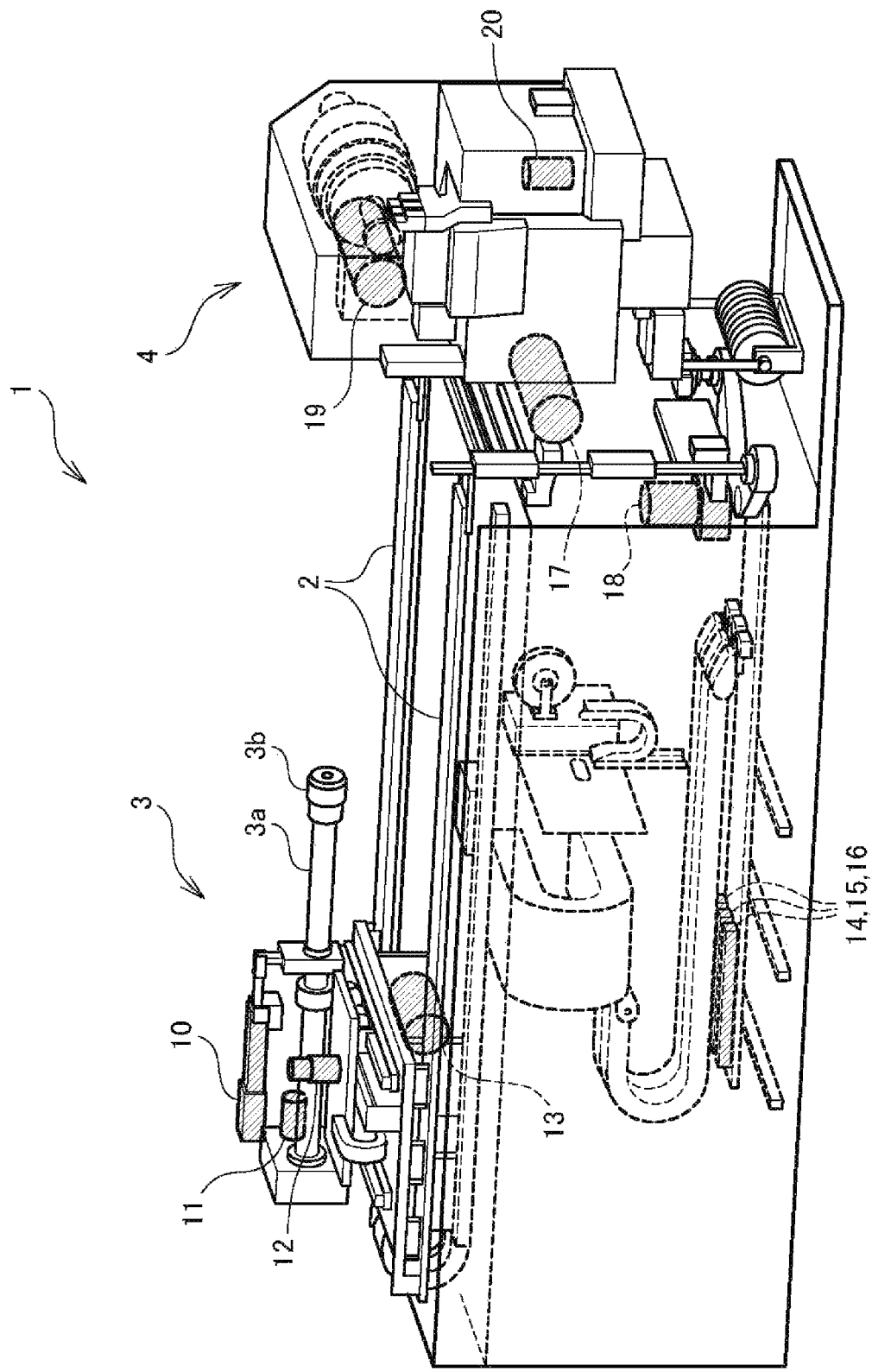
FIG. 1 is an external view of an automated manufacturing machine 1 controllable with a control apparatus 100 for the automated manufacturing machine according to an embodiment.

FIG. 1 is a general external view of an automated manufacturing machine 1 in the present embodiment. The automated manufacturing machine 1 in the present embodiment is a machine tool (pipe bender) for automatically bending a long pipe into an intended shape. The automated manufacturing machine 1 in the present embodiment may be other than a pipe bender and may be any manufacturing machine that incorporates multiple actuators and automatically performs multiple operations such as holding, conveying, machining, or heating objects. The automated manufacturing machine 1 may be, for example, an automated food manufacturing machine, or may be a manufacturing system combining a multijoint robotic arm with a conveyor.

As shown in FIG. 1, the automated manufacturing machine 1 in the present embodiment is substantially in the shape of a horizontal rectangular prism. The automated manufacturing machine 1 includes two rails 2 extending lengthwise over the upper surface of the rectangular prism. The automated manufacturing machine 1 incorporates a conveyor unit 3 for holding and conveying a pipe to be machined (not shown) at one end (left in FIG. 1) of the rails 2. The automated manufacturing machine 1 incorporates a machining unit 4 at the end opposite to the conveyor unit 3. The machining unit 4 is used for machining, such as bending, of a pipe (not shown). The conveyor unit 3 includes a protruding cylindrical holder shaft 3a with a chuck 3b attached to its distal end for holding a pipe (not shown). The conveyor unit 3 is moved on the rails 2 with the chuck 3b holding the pipe to supply the pipe to the machining unit 4, which can then bend or otherwise machine the pipe.

The automated manufacturing machine 1 in the present embodiment can control the movement distance of the conveyor unit 3 and thus the conveying distance of the pipe. The position on the pipe to be machined or for example bent can thus be controlled as appropriate. The holder shaft 3a with the chuck 3b can be turned (twisted) about its axis to bend the pipe in an intended direction. To achieve the above operations, the conveyor unit 3 incorporates an actuator 10 for opening and closing the chuck 3b, an actuator 11 for turning the holder shaft 3a about its axis, an actuator 12 for axially moving the holder shaft 3a forward or backward, and an actuator 13 for moving the conveyor unit 3 forward or backward on the rails 2. In the automated manufacturing machine 1 in the present embodiment, the actuators 10 to 13 are all servomotors operable on alternating current power. However, the automated manufacturing machine 1 may include actuators with other driving schemes (e.g., hydraulic cylinders, solenoids, or stepper motors) as appropriate for the intended performance of the actuators. The conveyor unit 3 also incorporates sensors such as encoders and limit switches for detecting the rotational position of the holder shaft 3a and the movement position of the conveyor unit 3. Such sensors are not shown in FIG. 1 to avoid complexity in the figure.

The machining unit 4 incorporates an actuator 17 for bending a pipe, an actuator 18 for changing the position on the pipe to which a force is applied for bending the pipe, an actuator 19 for vertically moving the entire machining unit 4, and an actuator 20 for forming a flat end surface (or a flange) or an annular protrusion (or a bulge) on the pipe. The machining unit 4 also incorporates switches and sensors such as contact switches and encoders. The switches and sensors are not shown to avoid complexity in the figure.

The machining unit 4 also incorporates multiple driver circuits (not shown) for driving the above actuators 10 to 13 and 17 to 20. The driver circuits are electrical components with the functions below. To act as intended, the actuators 10 to 13 and 17 to 20 are to receive drive currents with appropriate waveforms. The drive currents to be supplied to the actuators 10 to 13 and 17 to 20 differ depending on their driving schemes. Actuators with the same driving scheme may also have different drive current values. The machining unit 4 thus includes electrical components, or driver circuits, designed specifically for the actuators 10 to 13 and 17 to 20. The driver circuits output appropriate drive currents to the actuators 10 to 13 and 17 to 20 for driving these actuators at levels specified by the control apparatus 100 for the automated manufacturing machine.

As shown in FIG. 1, the space below the two rails 2 accommodates various machine parts. The space accommodates electrical cables (not shown) for supplying drive currents from the multiple driver circuits (not shown) in the machining unit 4 to the actuators 10 to 13 in the conveyor unit 3, and signal cables (not shown) for transmitting signals from the switches and sensors in the conveyor unit 3 to the machining unit 4. The electrical cables and the signal cables move in the space as the conveyor unit 3 moves forward or backward on the rails 2, possibly being entangled or caught on any component. To avoid such a situation, the space below the rails 2 also accommodates actuators 14 to 16. For the electrical cables and the signal cables having any unintended play, the actuators 14 to 16 pull the cables to eliminate the play. For the electrical cables and the signal cables being tensioned with a strong force, the actuators 14 to 16 loosen the cables to provide appropriate play. In the automated manufacturing machine 1 in the present embodiment, the actuators 14 to 16 are air cylinders actable under control by the control apparatus 100 for the automated manufacturing machine with driver circuits (not shown).

As described above, the automated manufacturing machine 1 incorporates the many actuators 10 to 20. To automatically machine an object (a pipe in this example) into an intended shape, the actuators 10 to 20 are to act timely and appropriately. The actuators 10 to 20 are driven by their respective driver circuits. The driver circuits drive the respective actuators 10 to 20 in accordance with the control program preloaded by the control apparatus 100 for the automated manufacturing machine (described later).

Figure 2:
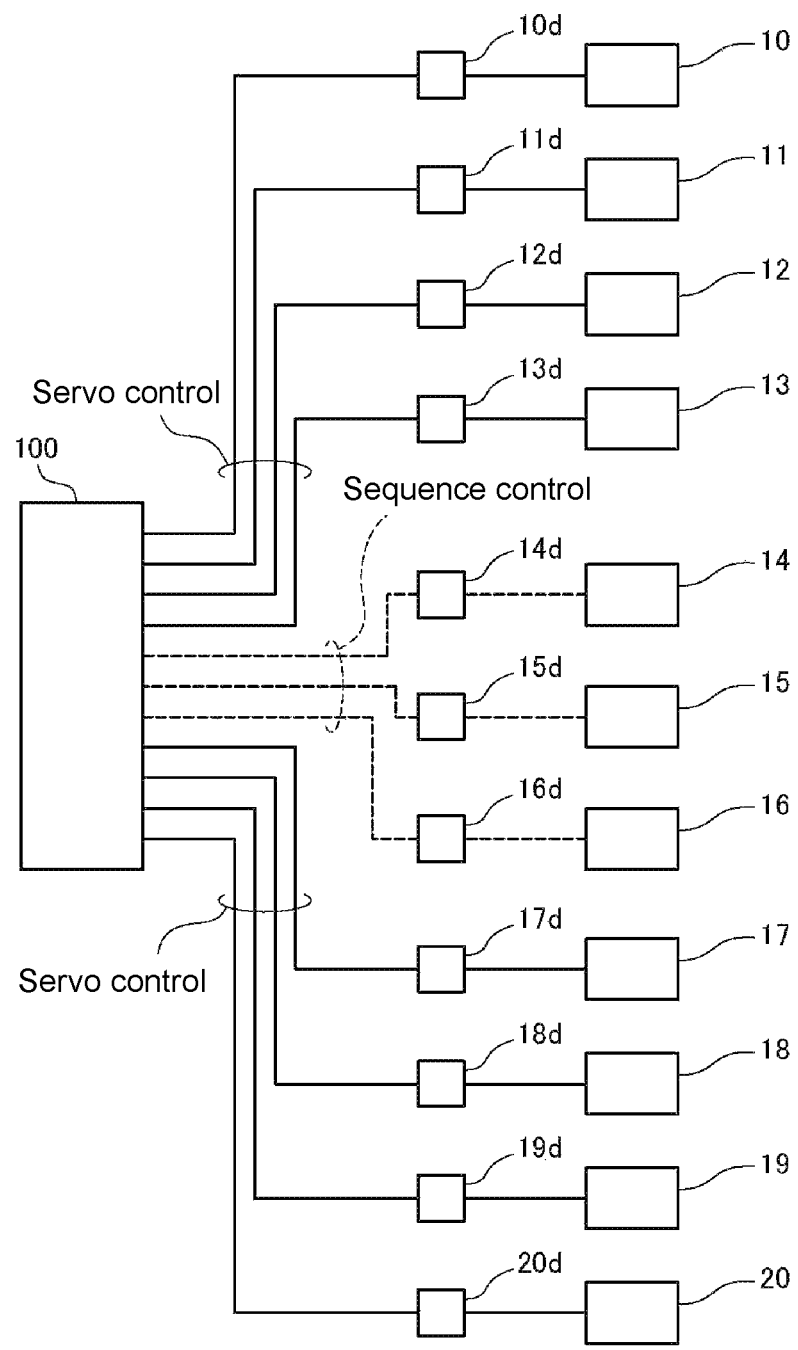
FIG. 2 is a conceptual block diagram of the control apparatus 100 for the automated manufacturing machine controlling the actions of actuators 10 to 20 incorporated in the automated manufacturing machine 1.

FIG. 2 is a conceptual block diagram of the control apparatus 100 for the automated manufacturing machine according to the present embodiment controlling the actions of the actuators 10 to 20 incorporated in the automated manufacturing machine 1. In FIG. 2, the switches and sensors used for the control are not shown. As shown in the figure, a driver circuit 10d for driving the actuator 10 is between the actuator 10 and the control apparatus 100 for the automated manufacturing machine. The control apparatus 100 for the automated manufacturing machine directly controls the driver circuit 10d. For the actuators 11 to 20 as well, driver circuits 11d to 20d for driving the respective actuators 11 to 20 are between the actuators 11 to 20 and the control apparatus 100 for the automated manufacturing machine. The control apparatus 100 for the automated manufacturing machine indirectly controls the actions of the actuators 11 to 20 with the driver circuits 11d to 20d.

As described above with reference to FIG. 1, the automated manufacturing machine 1 in the present embodiment includes the actuators 10 to 13 and 17 to 20 being servomotors and the actuators 14 to 16 being air cylinders. The servomotors herein are servo-controlled motors that typically regulate the values of current through the motors by feedback control to cause the positions (or the angles, speeds, or other parameters) to have target values. The air cylinders herein are actuators that linearly move their movable parts using air pressure and act by opening and closing the ports connected to sources of compressed air. The ports are open and closed under sequence control.

The servo-controlled actuators 10 to 13 and 17 to 20 and the sequence-controlled actuators 14 to 16 are thus connected to the control apparatus 100 for the automated manufacturing machine according to the present embodiment. In the figure, the solid lines connecting the actuators 10 to 13 and 17 to 20 to the control apparatus 100 for the automated manufacturing machine indicate the actuators 10 to 13 and 17 to 20 being servo-controlled. In the figure, the dashed lines connecting the actuators 14 to 16 to the control apparatus 100 for the automated manufacturing machine indicate the actuators 14 to 16 being sequence-controlled. Actuators controlled with any scheme other than servo control or sequence control may also be connected to the control apparatus 100 for the automated manufacturing machine.

The control apparatus 100 for the automated manufacturing machine controls the actuators 10 to 20 with the driver circuits 10d to 20d in accordance with the control program. The control program is to be pre-created and preloaded into the control apparatus 100 for the automated manufacturing machine. The control program is to allow timely and appropriate actions of the many actuators 10 to 20 as shown in FIG. 2. Such a control program cannot be easily created. For a machine including actuators with different control schemes, such as servo- and sequence-controlled actuators, in particular, creating the control program takes a long time. Developing a new automated manufacturing machine 1 thus involves creating the control program that uses a half or more of the development period in the present situation.

B. Creating Control Program

B-1. Overview

FIG. 3 shows conceptual diagrams showing general processes for developing a new automated manufacturing machine 1. (A) of FIG. 3 shows a known development process. (B) of FIG. 3 shows a new development process developed by the inventor of the present application for which a patent application has been filed.

In the known development process, as shown in (A) of FIG. 3, the machine designer first determines various functions to be included in the automated manufacturing machine 1, and creates drawings of the automated manufacturing machine 1 with the structure for performing the functions. To create the drawings, the machine designer determines individual features including the types of movable parts to be included, the intended actions of the movable parts, and the details of actuators for achieving the intended actions including the torque, ranges of motion, precision, locations, and number of such actuators. The machine designer then determines the actuators to be incorporated and finally completes the drawings after considering, for example, the ease of incorporation and maintenance of the actuators.

Once the automated manufacturing machine 1 is designed, a control program for controlling the automated manufacturing machine 1 is created. Creating the control program involves an engineer expert in software (in other words, a programmer). Once completing the machine design, the machine designer creates a flowchart describing the operation of the designed automated manufacturing machine 1. The machine designer then has a meeting with the programmer to explain the operation. This completes the machine designer's work.

At the meeting with the machine designer, the programmer learns the operation of the automated manufacturing machine 1 by carefully reading the flowchart, optionally drawings, drawings, and other materials created by the machine designer. The programmer then starts creating the control program for controlling the actions of the various actuators incorporated in the automated manufacturing machine 1. The programmer typically creates the control program using a human-readable, high-level programming language. The control program written in the high-level programming language is not computer-executable. The programmer converts the control program written in the high-level programming language into a computer-executable control program written in a machine language to complete the final control program. The conversion, or also referred to as compilation, of the control program written in the high-level programming language into the computer-executable control program can be complete in a short time using a dedicated program, or a compiler.

In the known development process, as illustrated in (A) of FIG. 3, creating the control program typically takes about 1.5 to 2.5 times more time than designing the machine. Most processes of designing the machine and creating the control program are difficult to perform in parallel, thus prolonging the development period of the automated manufacturing machine 1. The known development process involves experts with different skills, the machine designer and the programmer. This may also obstruct the development of a new automated manufacturing machine 1.

(B) of FIG. 3 shows a process for developing the automated manufacturing machine 1 with a new method presented by the inventor of the present application. The new method is similar to the known method in the machine design. More specifically, the machine designer first determines various functions to be included in the automated manufacturing machine 1, and creates drawings of the automated manufacturing machine 1 with the structure for performing the functions. The machine designer determines the actuators after determining, for example, the movable parts to be included for performing the functions, the motions of the movable parts, and the performance of the actuators for moving the movable parts. The machine designer then finally completes the drawings after considering, for example, the ease of incorporation and maintenance of the actuators.

In the new development process, the machine designer creates an action chart instead of a flowchart after completing the drawings (refer to (B) of FIG. 3). The action chart (described in detail later) describes the actions of the actuators determined by the machine designer designing the machine. The action chart is conceived by the inventor of the present application. This new action chart is hereafter referred to as a YOGO chart. The YOGO chart in the present embodiment corresponds to an action chart in one or more aspects of the present invention.

As described later, the YOGO chart simply describes the actions of the actuators determined by the machine designer designing the machine. The machine designer who has designed the machine can create the YOGO chart in about half the time taken for creating a flowchart (refer to (B) of FIG. 3). The YOGO chart can be read using a dedicated program and converted into a control program executable by a central processing unit (CPU) in the computer. The mechanism for converting the YOGO chart into a control program is also described later. The YOGO chart describing the operation of the automated manufacturing machine 1 can be used to generate the control program written in a machine language. This method can reduce the development period for a new automated manufacturing machine 1 to half or less (typically to about one-third) as compared with the known method, as shown in FIG. 3. The YOGO chart can also be easily created by the machine designer without the work to be performed by the programmer. Various matters that may obstruct the development of a new automated manufacturing machine 1 can thus be mostly eliminated. To change the operation of the automated manufacturing machine 1 or to incorporate an additional actuator to the automated manufacturing machine 1, the YOGO chart can be revised and read with a dedicated program for immediate generation of the control program. This is achieved with the mechanism below.

B-2. Principle of Automatically Generating Control Program from YOGO Chart

FIGS. 4A to 4C are diagrams showing the principle of automatically generating the control program for the automated manufacturing machine 1 from the action chart (YOGO chart). FIG. 4A is a primitive YOGO chart before undergoing various improvements. The YOGO chart in the present embodiment (described later) is an improvement on the primitive YOGO chart of FIG. 4A. However, the YOGO chart in the present embodiment uses the same principle as the primitive YOGO chart for automatically generating the control program. For easy understanding, the primitive YOGO chart of FIG. 4A is used to describe the principle of automatically generating the control program from the YOGO chart. To avoid complexity, the automated manufacturing machine 1 described herein includes two motors A and B and two cylinders A and B alone as actuators.

As shown in FIG. 4A, the YOGO chart describes the operation of the automated manufacturing machine 1 by combining the element actions of the actuators (the motors A and B and the cylinders A and B in this example). The element action of each actuator herein refers to the motion of the actuator in the direction of the inherent degree of freedom. For a rotary actuator such as a motor, for example, the element action is a rotation motion. For an actuator that moves forward or backward such as a cylinder, the element action is a forward or backward motion. For an actuator that rotates a ball screw with a motor to move a member engaged with the ball screw forward or backward, the element action is either the rotation motion of the motor or the forward or backward motion of the member. The element action of each actuator is thus a simple motion in the direction of the inherent degree of freedom of the actuator by a specified displacement.

The YOGO chart includes multiple subperiods into which the operation period from the start to the end of the operation of the automated manufacturing machine 1 is divided. The element action of each actuator is assigned to any of the subperiods. In the example of FIG. 4A, the operation period of the automated manufacturing machine 1 is divided into five subperiods 1 to 5. The subperiod 1 is assigned with the forward or backward motion of the cylinder A with a displacement (a). The subperiod 2 is assigned with the rotation motion of the motor A with a displacement (b). A subperiod may be assigned with multiple actions. More specifically, the subperiod 3 is assigned with two actions: the rotation motion of the motor B with a displacement (c) and the forward or backward motion of the cylinder B with a displacement (d). The subperiod 4 is assigned with three actions: the rotation motion of the motor A with a displacement (−b), the rotation motion of the motor B with a displacement (−c), and the forward or backward motion of the cylinder B with a displacement (−d). The last subperiod 5 is assigned with the forward or backward motion of the cylinder A with a displacement (−a).

The subperiods are thus assigned with the element actions of the actuators to describe the operation to be performed by the automated manufacturing machine 1 below. The cylinder A is first moved forward or backward with the displacement (a). Upon completion of the action of the cylinder A, the motor A is rotated by the displacement (b). Upon completion of the action of the motor A, the motor B is rotated by the displacement (c), and the cylinder B is moved forward or backward by the displacement (d). Upon completion of the actions of the motor B and the cylinder B, the motor A and the motor B are respectively rotated by the displacement (−a) and the displacement (−c), and the cylinder B is moved forward or backward by the displacement (−d). Upon completion of all the actions of the motor A, the motor B, and the cylinder B, the cylinder A is moved forward or backward by the displacement (−a). The actions are thus all complete. The element actions of the actuators incorporated in the automated manufacturing machine 1 can thus be assigned to any of the subperiods to describe the operation of the automated manufacturing machine 1.

As described above, each subperiod is the period for which the assigned actuator is to act, rather than the length of the period. For example, the subperiod 1 has a length for the cylinder A to act. The subperiod 2 has a length for the motor A to act. The subperiod 3 has a length being the longer one of the length for the motor B to act and the length for the cylinder B to act. The subperiods thus typically have different lengths.

The element actions of the actuators assigned to the subperiods are simple actions, such as rotating a motor by a predetermined angle or moving a cylinder forward or backward by a predetermined distance. The element actions of the actuators can thus be performed with small programs (hereafter, program elements) that can be pre-created. The automated manufacturing machine 1 herein incorporates four actuators, the cylinders A and B and the motors A and B. As shown in FIG. 4B, the pre-created program elements may include a program element prog1 to cause the motor A to act, a program element prog2 to cause the motor B to act, a program element prog3 to cause the cylinder A to act, and a program element prog4 to cause the cylinder B to act.

These program elements can be combined together in accordance with the description of the primitive YOGO chart shown in FIG. 4A to automatically generate the control program to cause the automated manufacturing machine 1 to operate. More specifically, as shown in FIG. 4C, the program element prog3 is first activated. Upon completion of the program element prog3, the program element prog1 is activated. Upon completion of the program element prog1, the program elements prog2 and prog4 are activated. The respective displacements for the program element prog3, the program element prog1, the program element prog2, and the program element prog4 are indicated by (a), (b), (c), and (d) in accordance with the indication on the YOGO chart. Upon completion of both the program element prog2 and the program element prog4, the program element prog1, the program element prog2, and the program element prog4 are activated. The respective displacements for these program elements are indicated by (−b), (−c), and (−d) in accordance with the indication on the YOGO chart. Upon completion of all the program elements prog1, prog2, and prog4, the program element prog3 is activated finally. The displacement for the program element prog3 is indicated by (−a) in accordance with the indication on the YOGO chart. Upon completion of the program element prog3, the operation of the automated manufacturing machine 1 described on the YOGO chart of FIG. 4A is complete.

As described above, the operation of the automated manufacturing machine 1 can be described as on the YOGO chart of FIG. 4A to generate the control program shown in FIG. 4C. The control program can cause the automated manufacturing machine 1 to operate. To cause the automated manufacturing machine 1 to operate as intended, the YOGO chart is to be created appropriately. To achieve this, the primitive YOGO chart of FIG. 4A has been improved variously to be the YOGO chart in the present embodiment described below.

B-3. YOGO Chart

Figure 5:
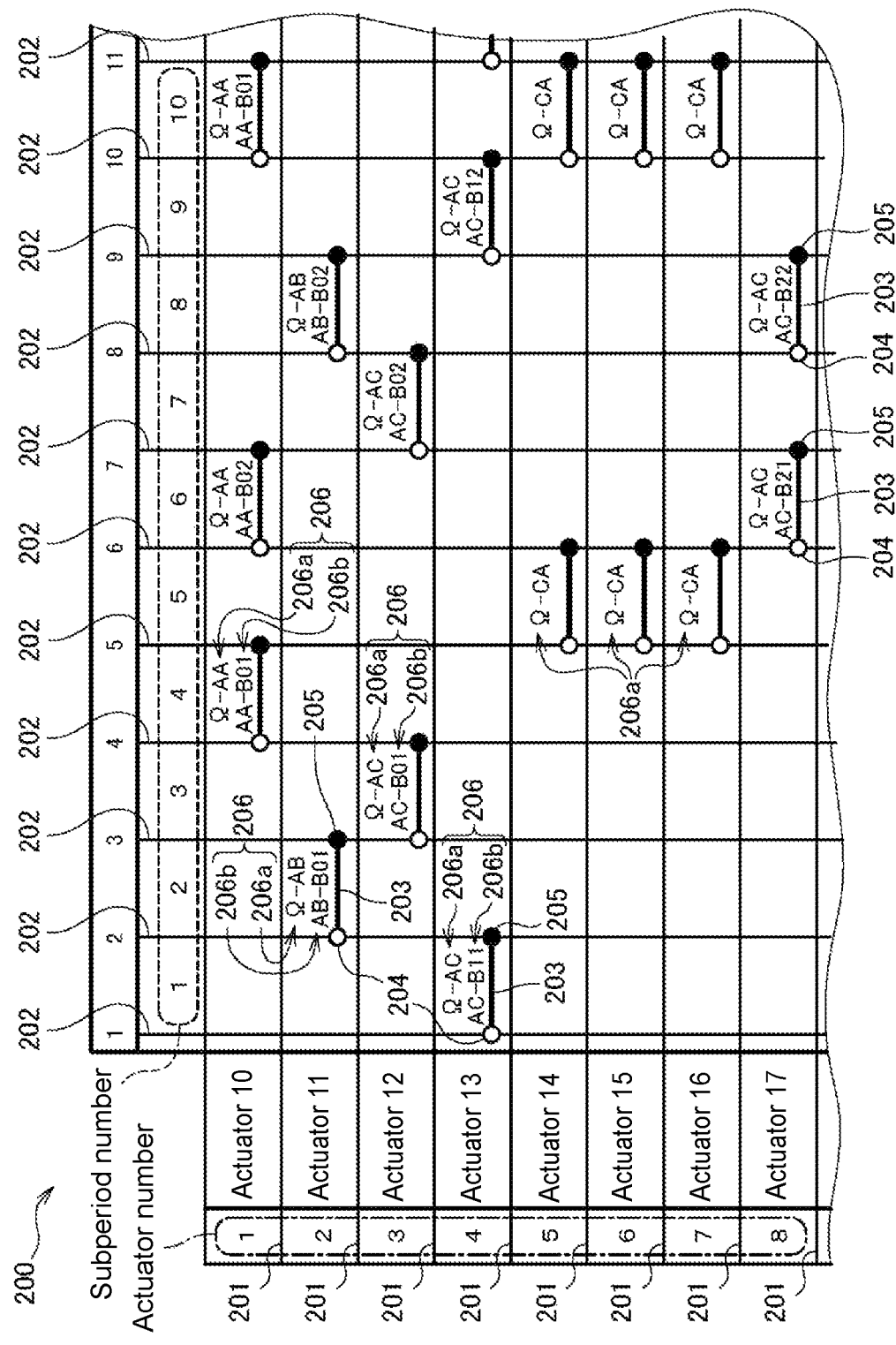
FIG. 5 is an example action chart (YOGO chart) shown partially for the automated manufacturing machine 1 to be read by the control apparatus 100 for the automated manufacturing machine according to the present embodiment.

FIG. 5 schematically shows a YOGO chart 200 in the present embodiment. FIG. 5 shows a part (the upper left corner) of the YOGO chart 200 to avoid scaling down and showing the entire chart being unreadable. As shown in FIG. 5, the YOGO chart 200 is a large table with multiple horizontal lines and multiple vertical lines intersecting with each other. The horizontal lines of the multiple intersecting lines are referred to as separation lines 201, and the vertical lines are referred to as trigger lines 202.

The trigger lines 202 are given serial numbers starting with number 1. In the example of FIG. 5, the trigger lines 202 have their serial numbers written in the top field of the YOGO chart 200. Each area defined by adjacent trigger lines 202 corresponds to the subperiod described above with reference to FIGS. 4A to 4C. The subperiods are also given serial numbers (hereafter, subperiod numbers) starting with 1. For the YOGO chart 200 of FIG. 5, the trigger lines 202 are drawn in the vertical direction, and thus the subperiods defined by the trigger lines 202 are arranged in the horizontal direction. However, the trigger lines 202 may be drawn in the horizontal direction. In this case, the subperiods are arranged in the vertical direction.

The YOGO chart 200 in the present embodiment is divided into multiple horizontal areas by multiple separation lines 201. The horizontal areas are given serial numbers (hereafter, actuator numbers) starting with number 1. Each actuator incorporated in the automated manufacturing machine 1 is assigned to any one of the areas. In the example of FIG. 5, the actuator 10 (refer to FIG. 1) is assigned to the area with the actuator number 1. The actuator 11 (refer to FIG. 1) is assigned to the area with the actuator number 2. The actuator 12 (refer to FIG. 1) is assigned to the area with the actuator number 3. The actuator 13 (refer to FIG. 1) is assigned to the area with the actuator number 4. The automated manufacturing machine 1 in the present embodiment incorporates the eleven actuators 10 to 20 each assigned with a horizontal area.

The element action of each of the actuators 10 to 20 is written at an appropriate position in the horizontal area assigned with the actuator. To cause the actuator 10 to perform its element action in the subperiod 4, for example, an element action 206 to be performed by the actuator 10 is written at the coordinate position of the square identified by the subperiod number 4 in the horizontal area with the actuator number 1 on the YOGO chart 200. To cause the actuator 10 to perform its element action in the subperiod 4 and the subperiod 8, the element action 206 to be performed by the actuator 10 is written at the coordinate position of the square identified by the subperiod number 4 in the horizontal area with the actuator number 1, and at the coordinate position of the square identified by the subperiod number 8 in the same horizontal area. The element action 206 of the actuator 10 is thus written in the horizontal area with the actuator number 1 on the YOGO chart 200. The element action 206 of the actuator 11 is written on the horizontal area with the actuator number 2. In this manner, the element action 206 of each of the actuators 10 to 20 is written in the area assigned with the actuator on the YOGO chart 200. The YOGO chart 200 in the present embodiment describes the element actions in this manner for the reasons below.

First, the primitive YOGO chart of FIG. 4A will be described. The primitive YOGO chart includes the actions of multiple actuators in an unorganized manner, and may thus disable the engineer from, for example, immediately obtaining the action period for which the cylinder A acting in the subperiod 1 is to act subsequently. From this chart, the engineer may have difficulty in picturing the actions of the actuators and in determining the number of times each actuator acts. This may cause the engineer to overlook any actuator yet to return to its original position or any actuator with its action undescribed.

The YOGO chart 200 in the present embodiment, in contrast, defines separate areas for the respective actuators, and the action of each actuator is described in the corresponding area, as shown in FIG. 5. The YOGO chart 200 thus allows the engineer to visually determine an actuator to act and a subperiod for the action easily and also to easily obtain the number of times each actuator acts. The engineer can thus easily notice any actuator yet to return to its original position or any actuator with its action undescribed. The YOGO chart 200 can thus be easily created to allow the automated manufacturing machine 1 to operate as intended.

The YOGO chart 200 in the present embodiment describes the element actions as described below. In one example, the element action 206 of the actuator 13 that acts first on the YOGO chart 200 of FIG. 5 will now be described. The actuator 13, which acts first, corresponds to the subperiod number 1 and the actuator number 4. The element action 206 is thus written at the coordinate position of the square with the actuator number 4 and the subperiod number 1 on the YOGO chart 200. The square corresponding to the coordinate position with the subperiod number 1 is between the number-1 trigger line 202 on the left and the number-2 trigger line 202 on the right. An action line 203 indicating the action of the actuator is thus drawn from the number-1 trigger line 202 to the number-2 trigger line 202. The action line 203 has a start point 204 at the left end (thus on the number-1 trigger line 202) to indicate the start of the action. The action line 203 has an end point 205 at the right end (thus on the number-2 trigger line 202) to indicate the end of the action. In the example of FIG. 5, the action line 203 is a thick solid line, the start point 204 is an outlined circle, and the end point 205 is a solid circle.

The element action 206 to be performed by the actuator is written above the action line 203. The YOGO chart 200 in the present embodiment describes each element action 206 using two elements, an action identifier and a numerical table. In the example of FIG. 5, the two identifiers, Ω-AC and AC-B11, are written above the action line 203 with the actuator number 4 and the subperiod number 1. Ω-AC is the action identifier 206a. AC-B11 is the numerical table 206b. Although the action identifier 206a and the numerical table 206b will be described in more detail later, the action identifier 206a generally represents qualitative details (e.g., forward motion, backward motion, or rotation) of the element action 206, and the numerical table 206b generally includes numerical values representing the quantitative details (e.g., the movement distance, speed, or torque) of the element action 206.

On the YOGO chart 200 of FIG. 5, Ω-AC and AC-B11 are at the coordinate position with the actuator number 4 and the subperiod number 1, showing that the actuator with the actuator number 4 (the actuator 13 in the example of FIG. 5) performs the element action in accordance with the action identifier 206a (Ω-AC) at the time with the subperiod number 1 using the specific numerical values included in the numerical table 206b (AC-B11).

On the YOGO chart 200 of FIG. 5, the actuator 10 has the action identifier 206a (Ω-AA), and the actuator 11 has the action identifier 206a (Ω-AB). The actuators 10 and 11 have different numerical tables 206b. The actuator 10 opens and closes the chuck 3b, whereas the actuator 11 turns (or twists) the holder shaft 3a about its axis, as described above with reference to FIG. 1. More specifically, the actuator 10 has the element action with the action identifier 206a indicating an opening or closing motion, whereas the actuator 11 has the element action with the action identifier 206a indicating a rotation motion. The actuator 10 and the actuator 11 thus have different action identifiers 206a. Similarly, the actuator 11 and the actuator 12 have different action identifiers 206a.

In contrast, the actuator 12 and the actuator 13 have the same action identifier 206a (Ω-AC). As described above with reference to FIG. 1, the actuator 12 axially moves the holder shaft 3a forward or backward. The actuator 13 moves the entire conveyor unit 3 forward or backward. The actuators 12 and 13 thus perform the same type of action, or specifically moving objects forward or backward, although the objects have different sizes, weights, movement distances, or other parameters. Thus, the actuator 12 and the actuator 13 have the same action identifier 206a. The actuator 17 vertically moves the entire machining unit 4. The vertical motion can be referred to as a forward or backward motion. The actuator 17 can thus have the same action identifier 206a (Ω-AC) as the actuator 12 and the actuator 13. The actuators 14 to 16 are all air cylinders moving forward or backward and thus have the action identifier 206a (Ω-CA).

The YOGO chart 200 in the present embodiment thus describes the element action 206 of each actuator (basically) using the action identifier 206a and the numerical table 206b. This allows the same action identifier 206a to be used for multiple actuators. Although the automated manufacturing machine 1 in the present embodiment incorporates the eleven actuators 10 to 20 as shown in FIG. 1, the YOGO chart 200 uses four action identifiers 206a.

B-4. Action Identifier

FIG. 6 is a table showing the details of the action identifiers 206a used on the YOGO chart 200 in the present embodiment. The action identifier 206a (Ω-AA) indicates the opening or closing motion to be performed by an actuator combining an alternating-current (AC) servomotor and a chuck unit. In other words, the action identifier 206a (Ω-AA) cannot be used for an actuator that performs the opening or closing motion but is other than an actuator combining an AC servomotor and a chuck unit.

The action identifier 206a (Ω-AA) is used for the opening or closing motion to be performed by an actuator combining an AC servomotor and a chuck unit. Such a simple action can be performed with a small program (or a program element) that can be pre-created. The action identifier 206a is stored in a manner associated with a serial number (hereafter, a program element number) for identifying the program element to perform the action. With the program element number stored in a manner associated with the action identifier 206a, the action identifier 206a (Ω-AA) cannot be used for an actuator that performs the opening or closing motion but is other than an actuator combining an AC servomotor and a chuck unit. In other words, actuators with different structures may use different program elements to act. The action identifiers 206a associated with such different program elements are thus also different.

As shown in FIG. 6, the action identifier 206a (Ω-AB) indicates the rotation motion to be performed by an actuator combining an AC servomotor and a reducer. The action identifier 206a (Ω-AB) is stored in a manner associated with the program element number 7. The action identifier 206a (Ω-AC) indicates the forward or backward motion to be performed by an actuator combining an AC servomotor and a ball screw unit. The action identifier 206a (Ω-AC) is stored in a manner associated with the program element number 4. The action identifier 206a (Ω-CA) indicates the forward or backward motion to be performed by an actuator being an air cylinder. The action identifier 206a (Ω-CA) is stored in a manner associated with the program element number 2.

B-5. Numerical Table

The action identifiers 206a simply include qualitative information about actions such as the opening or closing motion, the rotation motion, or the forward or backward motion without numerical quantitative information. The action identifiers 206a are basically combined with the numerical tables 206b. On the YOGO chart 200 described above with reference to FIG. 5, for example, the actuator 10 with the actuator number 1 has the action identifier 206a (Ω-AA). For the numerical table 206b, the actuator 10 has the numerical table 206b (AA-B01) at the time with the subperiod number 4, the numerical table 206b (AA-B02) at the time with the subperiod number 6, and the numerical table 206b (AA-B01) at the time with the subperiod number 10. The identifier AA-B01 herein refers to B01 as the numerical table 206b combined with Ω-AA as the action identifier 206a. The identifier AA-B02 herein refers to B02 as the numerical table 206b combined with Ω-AA as the action identifier 206a.

FIGS. 7A and 7B are example numerical tables 206b each combined with the action identifier 206a (Ω-AA). FIG. 7A is the numerical table 206b (AA-B01). FIG. 7B is the numerical table 206b (AA-B02). Although FIGS. 7A and 7B are two example numerical tables 206b, more numerical tables 206b may be used. The numerical tables 206b illustrated in FIGS. 7A and 7B each include four fields: the numerical table number, the opening-closing speed, the opening-closing load, and the lookup table. The numerical table number is the serial number of the numerical table 206b. For example, the numerical table 206b (AA-B01) of FIG. 7A is identified in response to the numerical table number 5 being specified. The numerical table 206b (AA-B02) of FIG. 7B is identified in response to the numerical table number 6 being specified. The lookup table will be described later.

Of the four fields in the numerical tables 206b illustrated in FIGS. 7A and 7B, the two fields, the opening-closing speed and the opening-closing load, are used to describe the element actions 206 in combination with the action identifier 206a. The numerical tables 206b are combined with the action identifier 206a (Ω-AA) indicating the opening or closing motion, and thus include the two fields, the opening-closing speed and the opening-closing load. The action identifier 206a (Ω-AA) alone simply qualitatively indicates the opening or closing motion without the quantitative details such as the speed or load for the opening or closing motion. The numerical tables 206b thus include the opening-closing speed field and the opening-closing load field storing numerical values. In the opening-closing speed field in the numerical tables 206b, a positive numerical value indicates a closing motion (refer to FIG. 7A), and a negative numerical value indicates an opening motion (refer to FIG. 7B).

On the YOGO chart 200 of FIG. 5, the actuator 11 with the actuator number 2 has the action identifier 206a (Ω-AB). The actuator 11 also has the numerical table 206b (AB-B01) at the time with the subperiod number 2, and the numerical table 206b (AB-B02) at the time with the subperiod number 8. The identifier AB-B01 refers to B01 as the numerical table 206b combined with Ω-AB as the action identifier 206a. The identifier AB-B02 refers to B02 as the numerical table 206b combined with Ω-AB as the action identifier 206a.

FIGS. 8A and 8B are example numerical tables 206b each combined with the action identifier 206a (Ω-AB). FIG. 8A is the numerical table 206b (AB-B01). FIG. 8B is the numerical table 206b (AB-B02). Although FIGS. 8A and 8B are two example numerical tables 206b, more numerical tables 206b may be used. The numerical tables 206b illustrated in FIGS. 8A and 8B each include five fields: the numerical table number and the lookup table as well as the rotation angle, the rotation speed, and the torque. Of these fields, the rotation angle, the rotation speed, and the torque are used to describe the element actions 206 in combination with the action identifier 206a. The numerical tables 206b of FIGS. 8A and 8B are combined with the action identifier 206a (Ω-AB) indicating the rotation motion, and thus include the rotation angle, the rotation speed, and the torque. The action identifier 206a (Ω-AB) alone simply indicates the rotation motion without the details about the angle, speed, or torque of the rotation. The numerical tables 206b thus include numerical values for the rotation angle, the rotation speed, and the torque. The rotation angle in the numerical tables 206b may be a positive numerical value or a negative numerical value. The different signs, plus and minus, indicate opposite rotation directions.

On the YOGO chart 200 of FIG. 5, the actuator 12 with the actuator number 3, the actuator 13 with the actuator number 4, and the actuator 17 with the actuator number 8 have the same action identifier 206a (Ω-AB) but different numerical tables 206b. More specifically, the actuator 12 with the actuator number 3 has the numerical table 206b (AC-B01) or (AC-B02), the actuator 13 with the actuator number 4 has the numerical table 206b (AC-B11) or (AC-B12), and the actuator 17 with the actuator number 8 has the numerical table 206b (AC-B21) or (AC-B22). The identifiers AC-B01, AC-B02, AC-B11, AC-B12, AC-B21, and AC-B22 herein respectively refer to B01, B02, B11, B12, B21, and B22 as the numerical tables 206b each combined with Ω-AC as the action identifier 206a.

FIGS. 9A to 9F are example numerical tables 206b each combined with the action identifier 206a (Ω-AC). Although FIGS. 9A to 9F are six example numerical tables 206b, more numerical tables 206b may be used. The numerical tables 206b illustrated in FIGS. 9A to 9F each include five fields: the numerical table number and the lookup table as well as the movement distance, the movement speed, and the movement load. Of these fields, the movement distance, the movement speed, and the movement load are used to describe the element actions 206 in combination with the action identifier 206a. The numerical tables 206b of FIGS. 9A to 9F are combined with the action identifier 206a (Ω-AC) indicating the forward or backward motion, and thus include the movement distance, the movement speed, and the movement load. The movement distance in the numerical tables 206b may be a positive numerical value or a negative numerical value. The different signs, plus and minus, indicate opposite movement directions.

On the YOGO chart 200 of FIG. 5, the actuator 14 with the actuator number 5, the actuator 15 with the actuator number 6, and the actuator 16 with the actuator number 7 all have the action identifier 206a (Ω-CA). This corresponds to the actuators 14 to 16 all being air cylinders with the forward or backward motion as the element actions 206. The action identifier 206a (Ω-CA) is not combined with any numerical table 206b. More specifically, the actuators 14 to 16, which are air cylinders switching between two operation ports for air pressure, have no quantitative numerical value representing their action details.

As described above in detail, the YOGO chart 200 in the present embodiment describes each element action 206 at the coordinate position identified by the subperiod number and the actuator number to indicate the actuator to perform the element action and the timing of the element action. Each element action 206 is basically indicated by the combination of the action identifier 206a and the numerical table 206b. This avoids errors in information written on the YOGO chart 200 in the manner described below.

The element action 206 of an actuator can be described far more simply by a forward motion or a rotation than, for example, a forward motion by 55 mm or a forward rotation by 35 degrees. A qualitative description such as a forward motion or a rotation of the actuator is an intuitive expression of an engineer' idea, whereas the additional quantitative details such as 55 mm or 35 degrees are specific values apart from such an intuitive expression of the idea. As illustrated in FIG. 5, the YOGO chart 200 includes many element actions 206. With the individual element actions 206 more difficult to describe, the entire YOGO chart 200 is more likely to include errors in information on the chart.

In contrast, the YOGO chart 200 in the present embodiment describes each element action 206 using the combination of the action identifier 206a and the numerical table 206b. For creating the YOGO chart 200, the engineer may focus on selecting the action identifiers 206a and may tentatively determine the numerical tables 206b. The work of creating the YOGO chart 200 is thus substantially the same as the work of intuitively expressing the engineer's idea. This greatly reduces errors in information written on the YOGO chart 200. The movement distance of any actuator can be corrected simply by correcting the numerical table 206b without correcting the YOGO chart 200. This avoids the YOGO chart 200 being corrected unintendedly.

Dividing the element action 206 of each actuator into the action identifier 206a and the numerical table 206b can limit the action identifier 206a usable for the actuator. In the example of FIG. 5, the actuator 10 has only the action identifier 206a (Ω-AA). For the actuator 10 that opens and closes the chuck 3b, the single action identifier 206a is sufficient to indicate a single type of action, or specifically the opening or closing motion, as qualitative information about the element action 206 (action identifier 206a). Actuators may also have multiple action identifiers 206a to indicate multiple manners of opening or closing the chuck 3b. In this case as well, the types of action identifiers 206a usable for each actuator can be limited to several types.

At the coordinate positions with the same actuator number on the YOGO chart 200, the same action identifier 206a (or several different action identifiers 206a) repeatedly appears. The engineer can thus easily notice and correct any erroneous action identifier 206a different from the other action identifiers 206a.

B-6. Lookup Table

As illustrated in FIGS. 7A to 9F, the numerical tables 206b in the present embodiment include the lookup table field. The lookup table is used to create the YOGO chart 200 easily.

FIGS. 10A and 10B are example lookup tables included in the numerical tables 206b of FIGS. 7A and 7B. FIG. 10A is a lookup table (AA-A01) included in the numerical table 206b (AA-B01) of FIG. 7A. FIG. 10B is a lookup table (AA-A02) included in the numerical table 206b (AA-B02) of FIG. 7B. The lookup tables of FIGS. 10A and 10B each include six fields: the maximum speed, the maximum load, the standard value of the opening-closing speed, the standard value of the opening-closing load, the reduction ratio of the chuck unit, and the possible diameter range for the chuck unit.

Of these fields, the maximum speed, the maximum load, the standard value of the opening-closing speed, and the standard value of the opening-closing load correspond to the numerical tables 206b (AA-B01 and AA-B02) of FIGS. 7A and 7B associated with the lookup tables (AA-A01 and AA-A02). More specifically, the numerical tables 206b (AA-B01 and AA-B02) include the numerical values of the opening-closing speed and the opening-closing load (refer to FIGS. 7A and 7B). The lookup tables include the maximum speed indicating the maximum value of the settable opening-closing speed, and include the maximum load indicating the maximum value of the settable opening-closing load. The standard value of the opening-closing speed and the standard value of the opening-closing load are used for the numerical tables 206b including no numerical values of the opening-closing speed and the opening-closing load.

The numerical table 206b (AA-B01) of FIG. 7A is created to include AA-A01 in the lookup table field. The numerical table 206b (AA-B02) of FIG. 7B is created to include AA-A02 in the lookup table field. For setting the numerical value for the opening-closing speed or the opening-closing load in the numerical table 206b (AA-B01 or AA-B02), the lookup table of FIG. 10A or 10B can be referred to for the maximum speed or the maximum load. This avoids setting the speed or load to an inappropriate numerical value exceeding the maximum speed or the maximum load. The numerical tables 206b can thus be created appropriately and easily.

For the numerical tables 206b (AA-B01 and AA-B02) including fields with no numerical values, the lookup tables can be referred to for the standard values for the corresponding fields. The YOGO chart 200 with the standard values may be tentatively used to operate the automated manufacturing machine 1, and can be appropriately completed later by correcting the numerical values in the numerical tables 206b as appropriate.

The lookup tables of FIGS. 10A and 10B also include the reduction ratio of the chuck unit and the possible diameter range for the chuck unit. These fields define the mechanical characteristics of actuators. The lookup tables are associated with the numerical tables 206b prepared for specific actuators. The lookup tables are thus also prepared for specific actuators. For example, the lookup tables of FIGS. 10A and 10B are associated with the numerical tables 206b of FIGS. 7A and 7B used for the actuator 10. The lookup tables of FIGS. 10A and 10B are thus used for the actuator 10.

The lookup tables are thus used for specific actuators. The lookup tables include the mechanical characteristics of the specific actuators. The lookup tables illustrated in FIGS. 10A and 10B are used for the actuator 11 combining the AC servomotor with the chuck unit to open and close the chuck 3b. More specifically, the lookup tables include the reduction ratio of the chuck unit and the diameter range of objects holdable with the chuck unit. For controlling the AC servomotor, the characteristic values can be read from the corresponding lookup table to obtain the mechanical characteristics. This avoids inappropriate control of the actuator using erroneous characteristic values for the motor control.

FIGS. 11A and 11B are example lookup tables included in the two numerical tables 206b of FIGS. 8A and 8B. FIG. 11A is the lookup table (AB-A01) included in the numerical table 206b (AB-B01) of FIG. 8A. FIG. 11B is the lookup table (AB-A02) included in the numerical table 206b (AB-B02) of FIG. 8B. The lookup tables each include seven fields: the angular range, the maximum rotation speed, the maximum torque, the standard value of the rotation angle, the standard value of the rotation speed, the standard value of the torque, and the reduction ratio.

Of these fields, the angular range, the maximum rotation speed, the maximum torque, the standard value of the rotation angle, the standard value of the rotation speed, and the standard value of the torque correspond to the numerical tables 206b (AB-B01 and AB-B02) of FIGS. 8A and 8B associated with the lookup tables (AB-A01 and AB-A02).

More specifically, the lookup tables include the maximum settable angular range, the maximum settable rotation speed, and the maximum settable torque corresponding to the numerical values of the rotation angle, the rotation speed, and the torque included in the numerical tables 206*b* (AB-B01 and AB-B02) (refer to FIGS. 8A and 8B). The standard value of the rotation angle, the standard value of the rotation speed, and the standard value of the torque are used for the numerical tables 206*b* including no numerical values of the rotation angle, the rotation speed, and the torque.

The numerical tables 206*b* (AB-B01 and AB-B02) of FIGS. 8A and 8B are created to respectively include AB-A01 and AB-A02 in the lookup table field. For setting the numerical value for the rotation angle in the numerical tables 206*b* (AB-B01 and AB-B02), the lookup tables are referred to for the angular range. This avoids setting the rotation angle to a numerical value exceeding ±180 degrees. For setting the numerical value for the rotation speed or the torque in the numerical tables 206*b* (AB-B01 and AB-B02) as well, the lookup tables are referred to for the maximum rotation speed or the maximum torque. This avoids setting the rotation speed or torque to an inappropriate numerical value exceeding the maximum rotation speed or the maximum torque.

For the numerical tables 206*b* (AB-B01 and AB-B02) fields with no numerical values, the lookup tables can be referred to for the standard values for the corresponding fields. The lookup tables illustrated in FIGS. 11A and 11B also include the reduction ratio of the reducer as the mechanical characteristic value of the actuator (the actuator 11 in this example) corresponding to the lookup table.

FIGS. 12A to 12C are example lookup tables included in the six numerical tables 206*b* of FIGS. 9A to 9F. FIG. 12A is the lookup table (AC-A01) included in the numerical table 206*b* (AC-B01) of FIG. 9A. FIG. 12B is the lookup table (AC-A02) included in the numerical table 206*b* (AC-B02) of FIG. 9B. FIG. 12C collectively shows the lookup tables (AC-A11, AC-A12, AC-A21, and AC-A22) included in the four numerical tables 206*b* (AC-B11, AC-B12, AC-B21, and AC-B22) of FIGS. 9C to 9F. The lookup tables each include eight fields: the movable range, the maximum movement speed, the maximum movement load, the standard value of the movement distance, the standard value of the movement speed, the standard value of the movement load, the reduction ratio, and the screw pitch.

Of these fields, the movable range, the maximum movement speed, the maximum movement load, the standard value of the movement distance, the standard value of the movement speed, and the standard value of the movement load correspond to the numerical tables 206*b* of FIGS. 9A to 9F associated with these lookup tables. More specifically, the lookup tables include the movable range, the maximum settable movement speed, and the maximum settable movement load corresponding to the numerical values of the movement distance, the movement speed, and the movement load included in the numerical tables 206*b* of FIGS. 9A to 9F. The standard value of the movement distance, the standard value of the movement speed, and the standard value of the movement load are used for the numerical tables 206*b* including no numerical values of the movement distance, the movement speed, and the movement load.

The numerical tables 206*b* illustrated in FIGS. 9A to 9F may be created to include appropriate lookup tables in the lookup table field. This avoids setting inappropriate numerical values for the numerical tables 206*b*. For the numerical tables 206*b* including fields with no numerical values, the lookup tables can be referred to for the standard values for the corresponding fields. The lookup tables illustrated in FIGS. 12A to 12C also include the reduction ratio of the reducer and the screw pitch of the ball screw unit as the mechanical characteristic values of the actuator corresponding to the lookup tables.

The lookup tables AC-A01 and AC-A02, the lookup tables AC-A11 and AC-A12, and the lookup tables AC-A21 and AC-A22 in FIGS. 12A to 12C used for different actuators include different numerical values set for the reduction ratio and the screw pitch indicating the mechanical characteristic values of actuators. In FIGS. 12A to 12C, the lookup tables AC-A01 and AC-A02 are used for the actuator 12. The lookup tables AC-A11 and AC-A12 are used for the actuator 13. The lookup tables AC-A21 and AC-A22 are used for the actuator 17. The lookup tables thus include different numerical values for different actuators with different mechanical characteristic values.

As described above in detail, the YOGO chart in the present embodiment describes the element action of each actuator using the action identifier 206*a* and the numerical table 206*b* at the coordinate position of the square identified by the actuator number and the subperiod number. The YOGO chart describes the operation of the automated manufacturing machine 1 using the element actions of all the actuators 10 to 20 incorporated in the automated manufacturing machine 1 as described above. The control apparatus 100 for the automated manufacturing machine generates the control program from the above YOGO chart to control the operation of the automated manufacturing machine 1.

Figure 13:
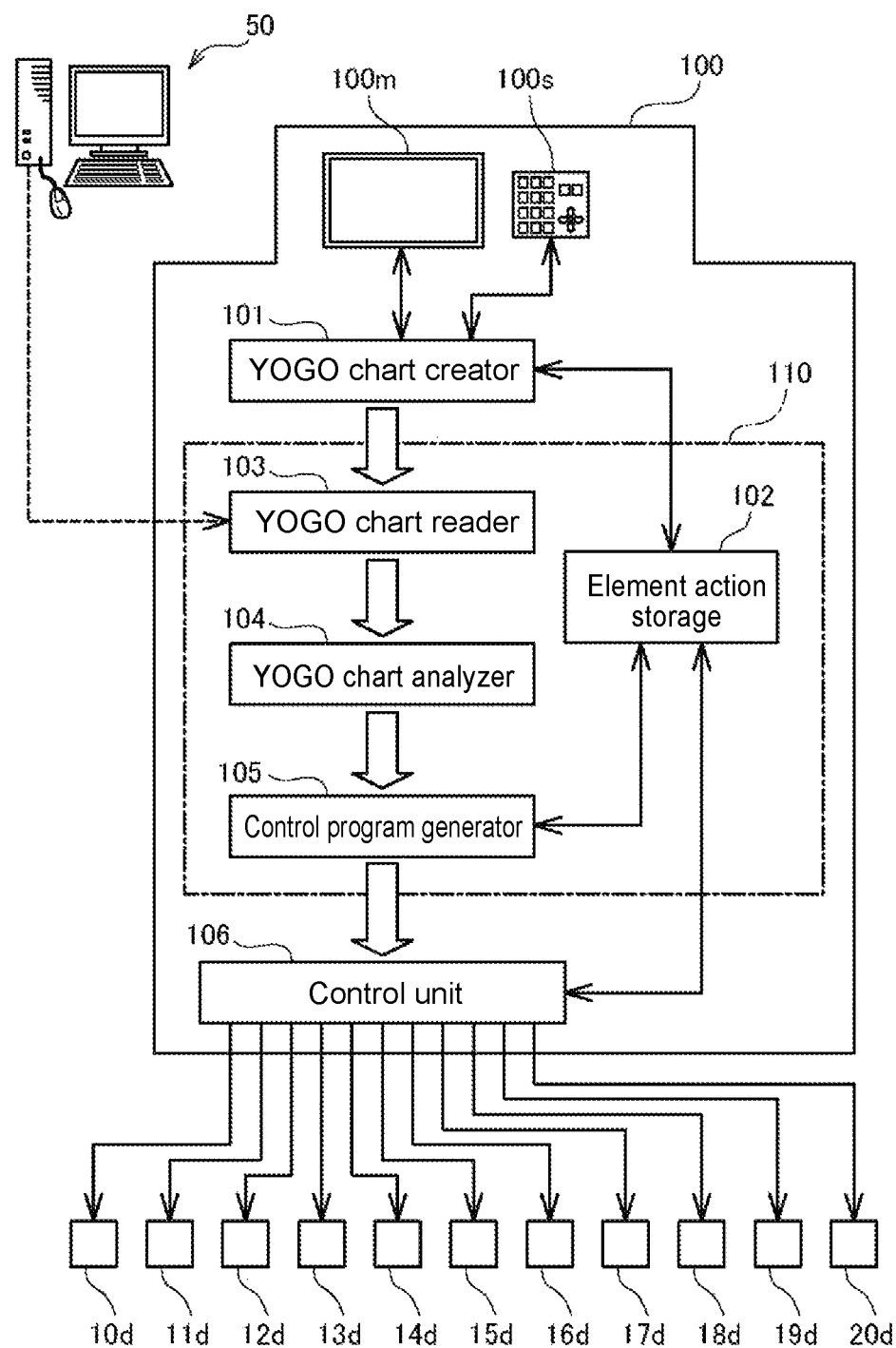
FIG. 13 is a functional block diagram of the control apparatus 100 for the automated manufacturing machine according to the present embodiment.

C. Control Apparatus 100 for Automated Manufacturing Machine According to Present Embodiment FIG. 13 is a functional block diagram of the control apparatus 100 for the automated manufacturing machine according to the present embodiment. As shown in FIG. 13, the control apparatus 100 for the automated manufacturing machine according to the present embodiment includes a YOGO chart creator 101, an element action storage 102, a YOGO chart reader 103, a YOGO chart analyzer 104, a control program generator 105, and a control unit 106. These units are conceptual representations of multiple functions to be included in the control apparatus 100 for the automated manufacturing machine to create the YOGO chart 200 and to generate the control program from the YOGO chart 200 to control the operation of the automated manufacturing machine 1. The control apparatus 100 for the automated manufacturing machine thus may not be a combination of components corresponding to these units. These units can be implemented in various forms, such as a program executable by the CPU, an electronic circuit combining integrated circuit (IC) chips and large-scale integrated (LSI) circuits, or a combination of these.

The YOGO chart creator 101 is connected to, for example, a monitor screen 100*m* and operation buttons 100*s*. A mechanical engineer with sufficient knowledge about the automated manufacturing machine 1 creates the YOGO chart 200 as illustrated in FIG. 5 by operating the operation buttons 100*s* while viewing the monitor screen 100*m*. As described above, the YOGO chart 200 describes the operation of the automated manufacturing machine 1 by assigning the element actions of the multiple actuators incorporated in the automated manufacturing machine 1 to any of the subperiods. The machine designer sufficiently considers appropriate combinations of the element actions of the actuators to achieve the operation of the automated manufacturing machine 1 when designing the machine. The machine designer can thus easily create the YOGO chart 200 describing the operation of the automated manufacturing machine 1. The YOGO chart 200 can also be created easily by any mechanical engineer with sufficient knowledge about the structure and operation of the automated manufacturing machine 1 other than the designer of the automated manufacturing machine 1.

In the present embodiment, each element action 206 is written on the YOGO chart basically using the action identifier 206a and the numerical table 206b. The usable action identifier 206a depends on the actuator (refer to FIG. 6). The element action storage 102 prestores, in a manner associated with each other, the names of the actuators and the action identifiers 206a usable for the actuators.

FIG. 14 is a table including the names of the actuators in a manner associated with the usable action identifiers 206a. The correspondence is stored in the element action storage 102. As shown in the figure, the element action storage 102 stores the action identifiers 206a usable for actuators in a manner associated with the actuators. The element action storage 102 also stores program element numbers in a manner associated with the action identifiers 206a. As described above, the program element number herein refers to the number identifying the program element to cause the actuator to perform the action indicated by the action identifier 206a. For each of the actuator 18 and the actuator 19, for example, two action identifiers 206a indicating different actions are selectable. The element action storage 102 stores the program element numbers for the respective action identifiers 206a. The element action storage 102 also stores the structures of the actuators and the details of the element actions of the actuators in a manner associated with the actuators. The element action storage 102 also stores the numerical tables 206b illustrated in FIGS. 7A to 9F and the lookup tables illustrated in FIGS. 10A to 12C.

The above element action storage 102 is connected to the YOGO chart creator 101. The mechanical engineer can thus refer to the element action storage 102 for creating the YOGO chart 200. Any mechanical engineer with sufficient knowledge about the automated manufacturing machine 1 can easily determine the types of actuators and the manner of acting the actuators. The mechanical engineer can thus select appropriate action identifiers 206a from the usable action identifiers 206a for the actuators. As described above, the action identifiers 206a include qualitative information about the element actions 206 without numerical quantitative information. The work of writing the action identifiers 206a on the YOGO chart 200 is substantially the same as the work of intuitively writing the operation to be performed by the automated manufacturing machine 1. This avoids errors in information on the chart. For numerical tables 206b, tentative numerical tables 206b may be prepared. As described above with reference to FIGS. 7A to 9F, the numerical tables 206b each have a name combining a serial number with a predetermined portion of the name of the corresponding action identifier 206a. The engineer may thus tentatively determine and write the names of the numerical tables 206b on the YOGO chart 200 and later correct numerical values in the numerical tables 206b or change the numerical tables 206b. In response to a numerical table 206b with a new name being created, the numerical table 206b is automatically assigned with a new numerical table number (refer to FIGS. 7A to 9F).

The YOGO chart reader 103 reads the YOGO chart 200 created with the YOGO chart creator 101 and outputs the YOGO chart 200 to the YOGO chart analyzer 104. In the present embodiment, the YOGO chart 200 is created with the control apparatus 100 for the automated manufacturing machine. More specifically, the YOGO chart reader 103 reads the YOGO chart 200 from the YOGO chart creator 101. In some embodiments, the YOGO chart reader 103 may read the YOGO chart 200 created with a computer 50 separate from the control apparatus 100 for the automated manufacturing machine.

The YOGO chart analyzer 104 analyzes the YOGO chart 200 received from the YOGO chart reader 103 to generate intermediate data, and outputs the intermediate data to the control program generator 105. The process for generating the intermediate data from the YOGO chart will be described in detail later.

Upon receiving the intermediate data, the control program generator 105 refers to the correspondences stored in the element action storage 102 to generate the control program from the intermediate data. The process for generating the control program from the intermediate data will be described in detail later. The control program generator 105 then outputs the resultant control program to the control unit 106.

Upon receiving the control program from the control program generator 105, the control unit 106 obtains the program elements stored in a manner associated with the program element numbers in the control program from the element action storage 102. The control unit 106 refers to the element action storage 102 to search for the numerical tables 206b stored in a manner associated with the numerical table numbers in the control program. The control unit 106 obtains numerical values included in the numerical tables 206b as arguments for the program elements. The control unit 106 thus reads the program elements and executes the program elements with the set arguments to control the actuators 10 to 20. This causes the actuators 10 to 20 incorporated in the automated manufacturing machine 1 to act as described on the YOGO chart 200.

The YOGO chart reader 103 in the present embodiment corresponds to an action chart reader in one or more aspects of the present invention. The YOGO chart reader 103, the YOGO chart analyzer 104, and the control program generator 105 described with reference to FIG. 13 operate in cooperation to generate the control program from the YOGO chart 200. In the control apparatus 100 for the automated manufacturing machine according to the present embodiment, the YOGO chart reader 103, the YOGO chart analyzer 104, and the control program generator 105 correspond to a control program generation apparatus 110 in one or more aspects of the present invention.

D. Control Program Generation Process

Figure 15:
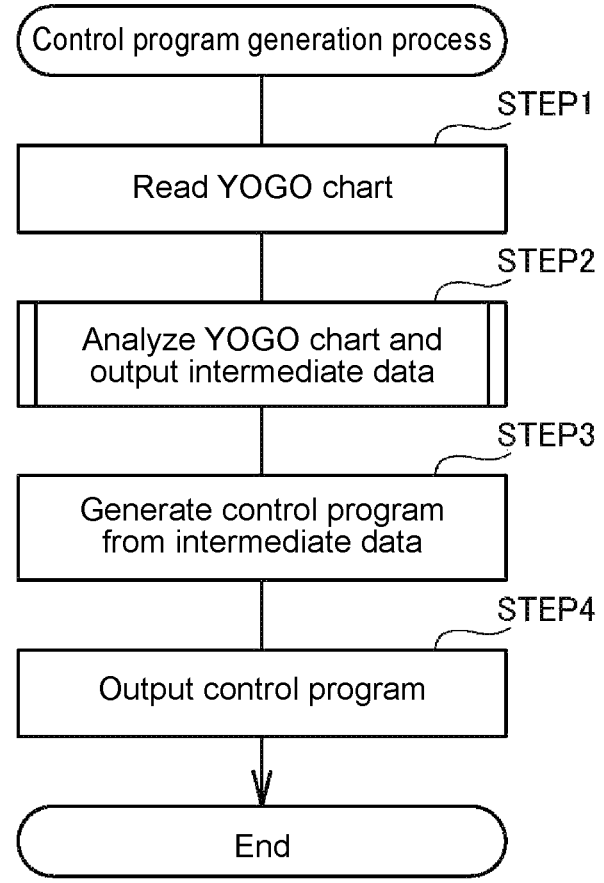
FIG. 15 is a flowchart of a control program generation process for generating the control program from the action chart (YOGO chart) performed by the control apparatus 100 for the automated manufacturing machine according to the present embodiment.

FIG. 15 is a general flowchart of the control program generation process performed by a section corresponding to the control program generation apparatus 110 in the control apparatus 100 for the automated manufacturing machine according to the present embodiment. In the control program generation process, as shown in the figure, the YOGO chart is read first (STEP 1). In the present embodiment, the YOGO chart with its data to be read is created with the control apparatus 100 for the automated manufacturing machine. In some embodiments, the YOGO chart with its data to be read may be created with another computer 50.

Figure 16:
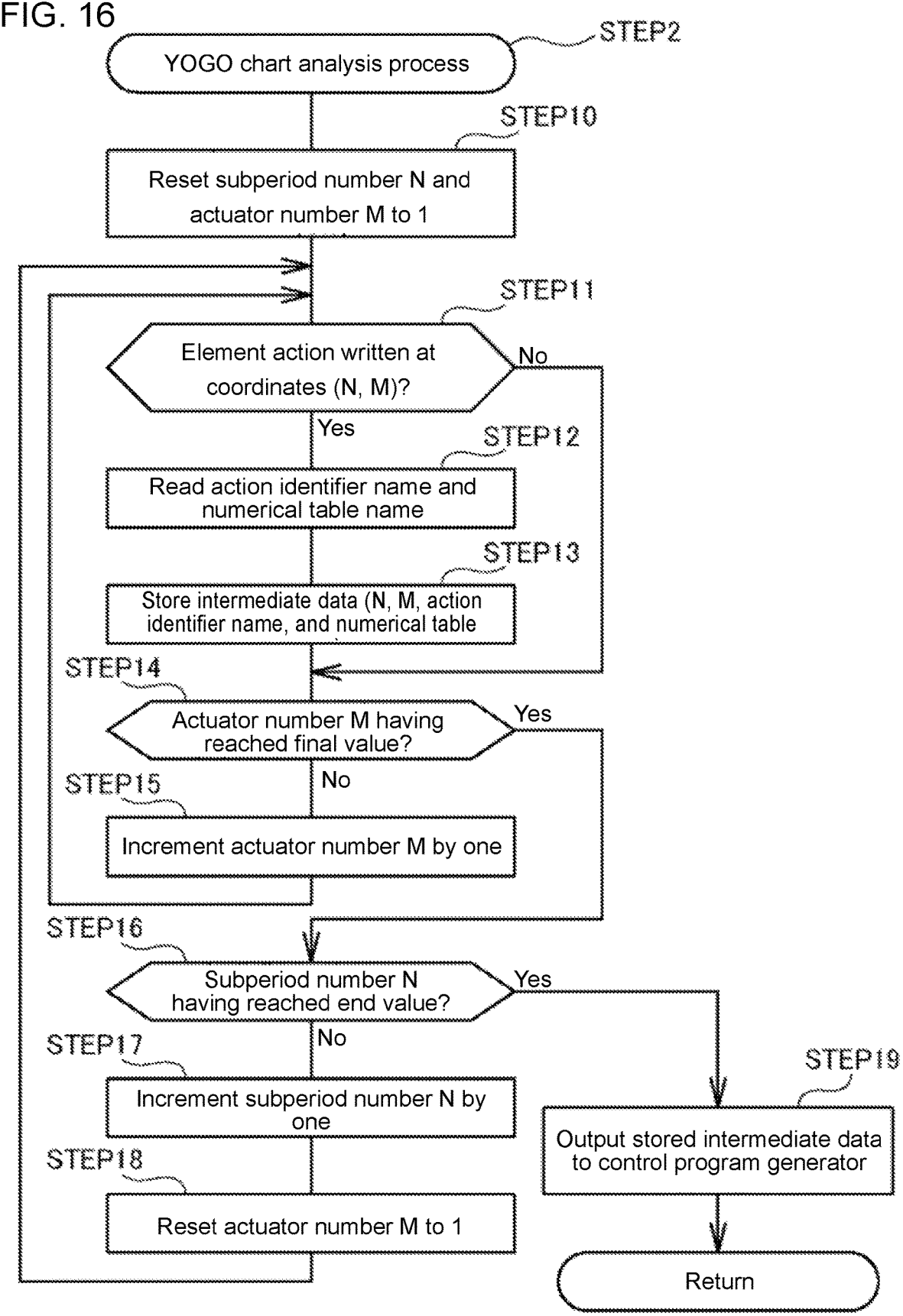
FIG. 16 is a flowchart of a YOGO chart analysis process performed in the control program generation process.

The read YOGO chart is then analyzed to output intermediate data (STEP 2). FIG. 16 is a flowchart of the process (YOGO chart analysis process) for analyzing the YOGO chart and outputting the intermediate data performed by the control apparatus 100 for the automated manufacturing machine according to the present embodiment. This process is performed by the YOGO chart analyzer 104 shown in FIG. 13.

At the start of the YOGO chart analysis process, as shown in FIG. 16, the subperiod number N and the actuator number M are each reset to 1 (STEP 10). The determination is performed as to whether an element action is written at the coordinates (N, M) on the YOGO chart 200 (STEP 11). The coordinates (N, M) on the YOGO chart 200 herein refer to the coordinate position of the square identified by the combination of the subperiod number N and the actuator number M on the YOGO chart 200. Immediately after STEP 10 in which the subperiod number N and the actuator number M are reset, N and M are both 1. Thus, the determination is performed as to whether an element action is written at the coordinates (1, 1) on the YOGO chart 200.

For the YOGO chart 200 of FIG. 5, no element action is written at the coordinates (1, 1), and the determination result in STEP 11 is negative. The determination is then performed as to whether the actuator number M has reached the final value (STEP 14). The final value for the actuator number M is 11, with the eleven actuators 10 to 20 being incorporated in the automated manufacturing machine 1 in the present embodiment. For the determination in STEP 14 as to whether an element action is written at the coordinates (1, 1), the determination result is negative. The actuator number M is then incremented by one (STEP 15). The actuator number M after the increment is used to determine again whether the element action 206 is written at the coordinate position (N, M) (STEP 11).

For every increment, by one, of the actuator number M with the subperiod number N fixed to 1, the determination is performed as to whether an element action is written at the coordinates (1, M) in the above manner. In response to the coordinates (1, M) with a written element action being reached, the determination result in STEP 11 is affirmative.

In response to the determination result in STEP 11 being affirmative, the action identifier 206a and any numerical table 206b for the element action written at the coordinates is read (STEP 12). For the YOGO chart 200 of FIG. 5, in response to the coordinates (1, 4) being reached, the determination result in STEP 11 is affirmative. This causes the action identifier 206a (Ω-AC) and the numerical table 206b (AC-B11) to be read as the element action 206.

Data, or hereafter intermediate data (N, M, the action identifier, and the numerical table), is then stored in the memory (STEP 13). The intermediate data includes the coordinates (N, M), the action identifier 206a, and the numerical table 206b for the read element action. For the coordinates (1, 4) on the YOGO chart 200 of FIG. 5, the intermediate data (1, 4, Ω-AC, AC-B11) is stored in the memory. The intermediate data indicates that the element action 206 is written at the position identified by the subperiod number 1 and the actuator number M being 4 on the YOGO chart 200, and also indicates that the element action 206 is identified by the action identifier 206a (Ω-AC) and the numerical table 206b (AC-B11).

The intermediate data read from the YOGO chart 200 is stored in the memory (STEP 13). The determination is then performed as to whether the actuator number M has reached the final value (11 in this example) (STEP 14). In response to the actuator number M being yet to reach the final value (no in STEP 14), the actuator number M is incremented by one (STEP 15), and the process returns to STEP 11 to determine again whether an element action is written at the coordinates (N, M) on the YOGO chart 200.

In response to the actuator number M reaching the final value (yes in STEP 14), the determination is performed as to whether the subperiod number N has reached an end value (STEP 16). For the YOGO chart 200 describing the operation of the automated manufacturing machine 1 using 100 subperiods, for example, the subperiod number N has the end value of 100.

In response to the subperiod number N being yet to reach the end value (no in STEP 16), the subperiod number N is incremented by one (STEP 17), the actuator number M is reset to 1 (STEP 18), and the process returns to STEP 11 to determine again whether an element action is written at the coordinates (N, M) on the YOGO chart 200. More specifically, the determination is performed for the subperiod with the subperiod number N being 1 from top to bottom on the YOGO chart 200 (refer to FIG. 5), then for the subperiod with the subperiod number N being 2 from top, and then for the subperiod with the subperiod number N being 3. In this manner, the element actions written on the YOGO chart 200 are read in sequence from the subperiod with a lower subperiod number N to the subperiod with a higher subperiod number N. The read element actions are stored as intermediate data in the memory.

Figures 17, 18:
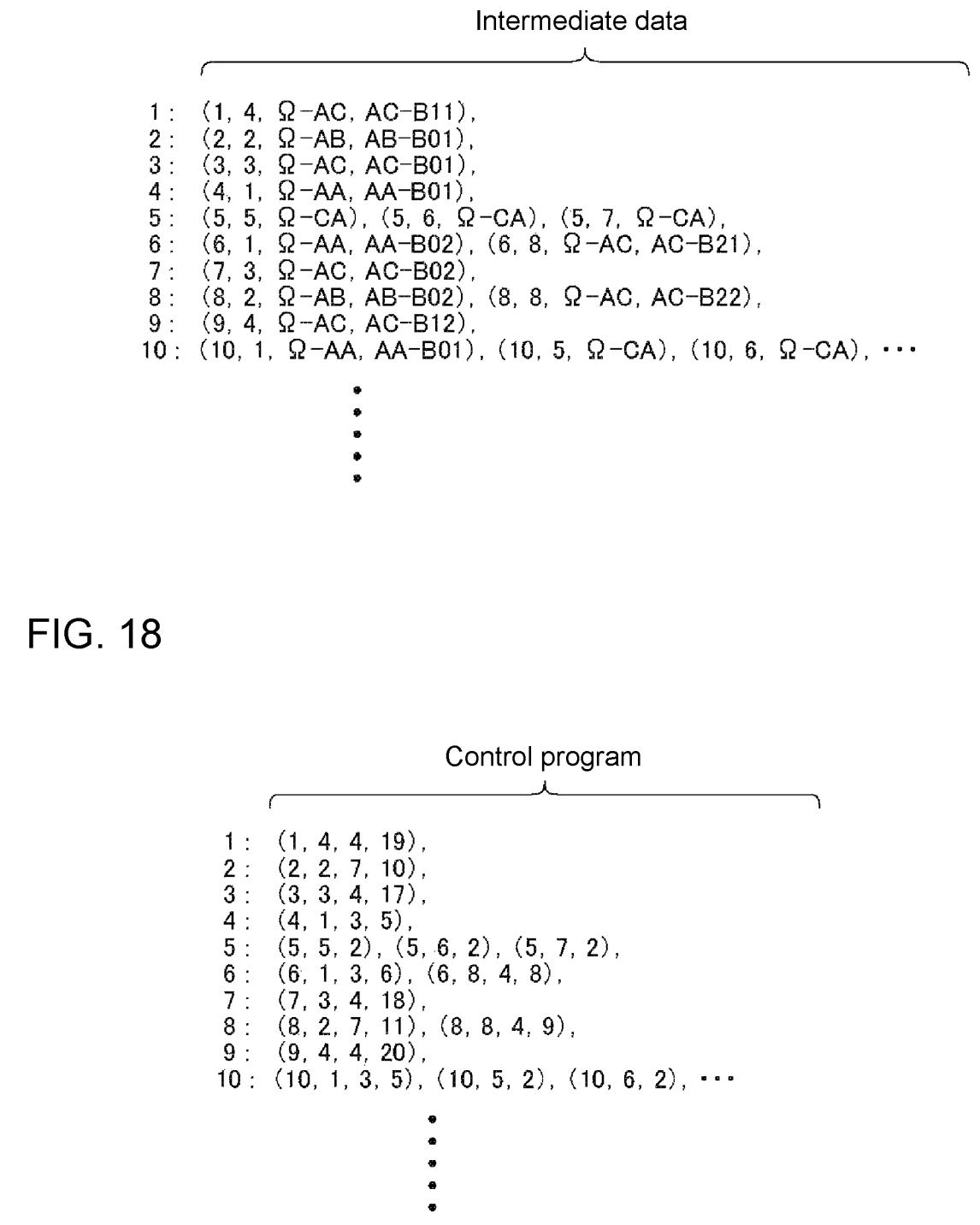

In response to the subperiod number N finally being determined to have reached the end value (yes in STEP 16) after the repeated processes above, the element actions written on the YOGO chart 200 have been all read. The intermediate data stored in the memory is then read and output to the control program generator 105 (STEP 19). FIG. 17 illustrates the intermediate data resulting from analyzing the YOGO chart 200 of FIG. 5. In response to the intermediate data being output, the YOGO chart analysis process in FIG. 16 is complete, and the process returns to the control program generation process in FIG. 15.

In the control program generation process shown in FIG. 15, the control program is generated based on the intermediate data obtained as described above (STEP 3). FIG. 18 shows the control program generated from the intermediate data illustrated in FIG. 17. The comparison between the intermediate data in FIG. 17 and the control program in FIG. 18 shows that the control program corresponds to the intermediate data but includes numerical values that have replaced the action identifiers 206a and the numerical tables 206b in the intermediate data. More specifically, the action identifiers 206a in the intermediate data are replaced with the program element numbers (refer to FIG. 14) for performing the action identifiers 206a. The numerical tables 206b in the intermediate data are replaced with the numerical table numbers of the numerical tables 206b. The control program results from such replacement.

The action identifiers 206a and the numerical tables 206b in the intermediate data are replaced with the program element numbers and the numerical table numbers by the control program generator 105 in FIG. 13 referring to the element action storage 102. The element action storage 102 stores the action identifiers 206a and the program element numbers in a manner associated with each other (refer to FIG. 14). The element action storage 102 also stores the numerical tables 206b illustrated in FIGS. 7A to 9F each including the numerical table number. The control program generator 105 replaces the action identifiers 206a and the numerical tables 206b in the intermediate data with the program element numbers and the numerical table numbers by referring to the correspondences in FIG. 14 and the numerical tables 206b of FIGS. 7A to 9F stored in the element action storage 102.

In response to the control program being generated from the intermediate data (STEP 3 in FIG. 15), the generated control program is output to the control unit 106 (STEP 4), and the control program generation process in FIG. 15 is complete.

As shown in FIG. 18, the control program in the present embodiment is a collection of sets of data (hereafter, datasets) each including the subperiod number N, the actuator number M, the program element number, and the numerical table number listed in this order. The first data in the dataset representing the subperiod number N is referred to as a first element. The second data representing the actuator number M is referred to as a second element. The third data representing the program element number is referred to as a third element. The fourth data representing the numerical table number is referred to as a fourth element. The control program in the present embodiment is simply a series of multiple datasets. The control unit 106 in the control apparatus 100 for the automated manufacturing machine uses such a control program to control the actions of the actuators 10 to 20 in the automated manufacturing machine 1 as described below.

E. Operation Control Process

Figure 19:
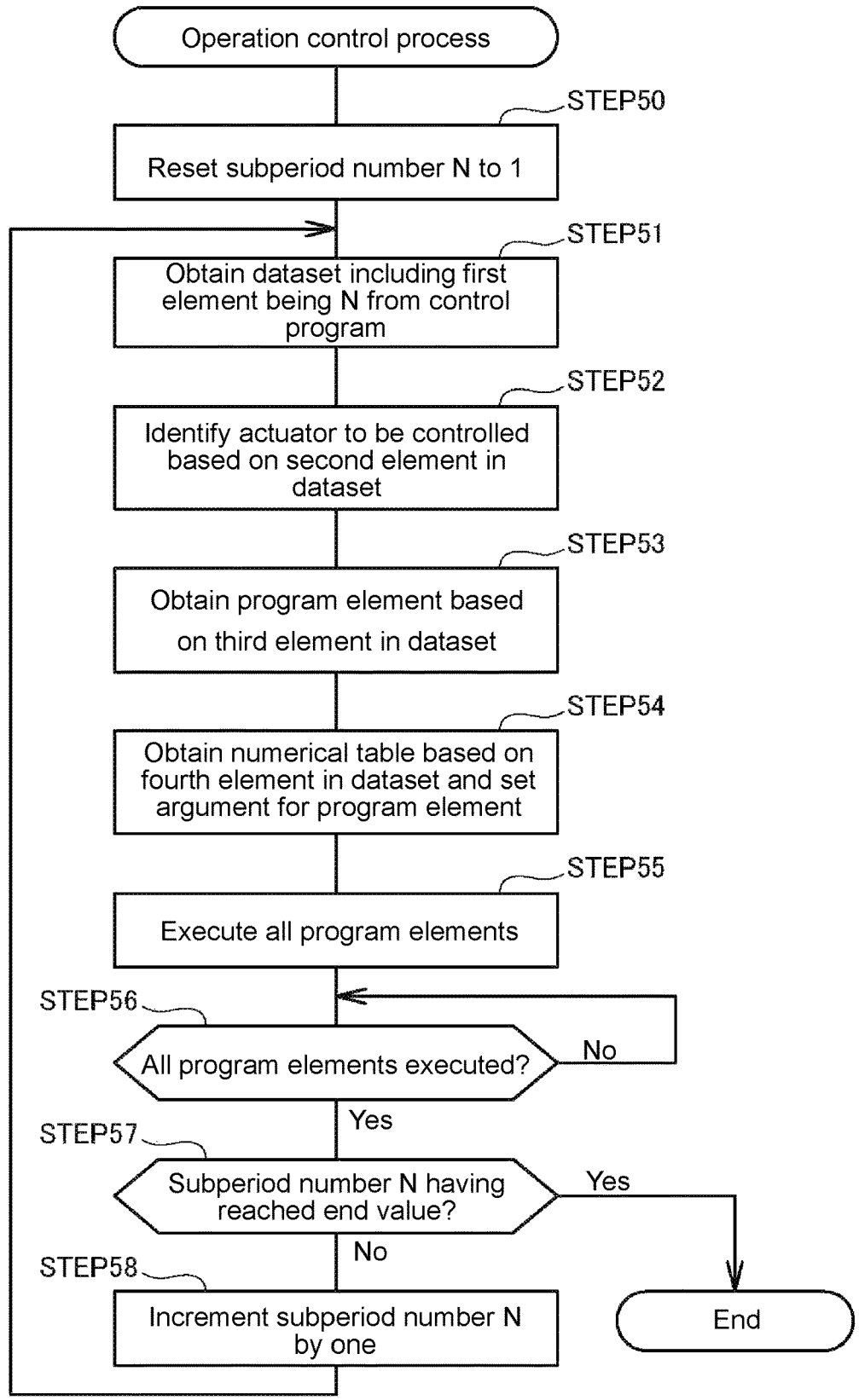
FIG. 19 is a flowchart of an operation control process for controlling the actions of the actuators based on control program data performed by the control apparatus 100 for the automated manufacturing machine according to the present embodiment.

FIG. 19 is a flowchart of the operation control process for controlling the operation of the automated manufacturing machine 1 in accordance with the control program performed by the control unit 106 in the control apparatus 100 for the automated manufacturing machine. At the start of the operation control process, as shown in FIG. 19, the subperiod number N is reset to 1 (STEP 50). The dataset including the first element being N is then obtained from the control program (STEP 51). Immediately after the start of the operation control process, the subperiod number N is set to 1. The dataset (1, 4, 4, 19) is thus read from the control program illustrated in FIG. 18.

The actuator to be controlled is then identified based on the value of the second element in the read dataset (STEP 52). For the dataset read in STEP 51 being (1, 4, 4, 19), the second element has the value of 4, indicating that the actuator with the actuator number M being 4 is to be controlled. For multiple datasets being read in STEP 51, the respective actuators to be controlled are identified based on the values of the second elements in the datasets.

The program element to cause the actuator to perform the element action is then obtained by searching for the program element number stored in the element action storage 102 based on the value of the third element in the read dataset (STEP 53). For the dataset read in STEP 51 being (1, 4, 4, 19), the third element has the value 4, indicating that the program element with the program element number 4 is to be used for the element action.

The dataset may finally include a fourth element having a value indicating the numerical table number for the parameter to be specified for the program element. The control unit 106 searches for and identifies the numerical table 206b having the numerical table number stored in the element action storage 102. The control unit 106 then sets a numerical value in the numerical table 206b as an argument for the program element (STEP 54).

The processes of STEP 51 to STEP 54 cause each actuator to be ready to perform the element action written in a subperiod (the subperiod with the subperiod number N being 1 immediately after the start of the operation control process) on the YOGO chart 200. More specifically, the actuator to be controlled is identified (STEP 52), the program element to be used for the control is obtained (STEP 53), and the argument is set for the program element (STEP 54). The program element is then executed (STEP 55). For the actuator being a servomotor and the element action being a 180-degree forward rotation of the motor, for example, the program element is executed to repeatedly drive the motor on a predetermined control cycle while detecting the rotation angle of the motor until the rotation angle reaches 180 degrees. Multiple program elements may be executed in parallel.

The determination is then performed as to whether all the program elements have been executed (STEP 56). For multiple program elements executed in STEP 55, the program elements may not be complete at the same time. Thus, the determination is performed as to whether all the program elements have been executed. For a single program element executed in STEP 55, the determination is performed as to whether the single program element has been executed.

In response to any program element remaining to be executed, the determination result in STEP 56 is negative, and the same determination (STEP 56) is repeated. This places the processing in a wait state until all the program elements are executed. In response to all the program elements being complete (yes in STEP 56), the determination is performed as to whether the subperiod number N has reached the end value (STEP 57). For the YOGO chart 200 describing the operation of the automated manufacturing machine 1 using 100 subperiods, for example, the determination is performed as to whether the subperiod number N has reached 100.

In response to the subperiod number N being yet to reach the end value (no in STEP 57), the subperiod number N is incremented by one (STEP 58). The process then returns to STEP 51 to read, from the control program, a dataset including the first element being a new subperiod number N. The read dataset then undergoes the above processes of STEP 52 to STEP 55. Thus, the target subperiod is shifted to the new subperiod next to the subperiod for which element actions have been performed. For the new subperiod, all the written element actions are performed. In response to all the element actions in the new subperiod being complete and the determination result in STEP 56 being affirmative, the determination is then performed as to whether the subperiod number N for the subperiod has reached the end value (STEP 57). In response to the subperiod number N being yet to reach the end value (no in STEP 57), the subperiod number N is incremented by one (STEP 58), and the process returns to STEP 51 to repeat the above processes STEP 51 to STEP 57 for a new subperiod number N.

In the operation control process in FIG. 19, selecting one subperiod and performing the element actions written in the selected subperiod are repeatedly performed from the first subperiod (the subperiod with the subperiod number N being 1) to the last subperiod (the subperiod with the subperiod number N being the end value) on the YOGO chart 200. In response to the element actions in the last subperiod being complete, the determination result in STEP 57 is affirmative, and the operation control process is complete.

As described in detail above, the control apparatus 100 for the automated manufacturing machine according to the present embodiment can produce the YOGO chart 200 describing the operation of the automated manufacturing machine 1. The control apparatus 100 can use the YOGO chart 200 to automatically generate the control program to cause the automated manufacturing machine 1 to operate. The YOGO chart 200 can be easily created by anyone with sufficient knowledge about the structure and operation of the automated manufacturing machine 1 without programming knowledge. This saves the work of a programmer creating the control program. This greatly reduces the time taken to develop a new automated manufacturing machine 1 (to half or less) and also eliminates the work to be performed by the programmer. Introducing new automated manufacturing machines to manufacturing sites is thus easier, achieving labor savings in industry.

The YOGO chart 200 in the present embodiment describes the element action 206 of each actuator using the action identifier 206a and the numerical table 206b. The action identifiers 206a simply include qualitative information about the element actions 206 without numerical quantitative information. The work of simply writing the action identifiers 206a on the YOGO chart 200 is substantially the same as the work of intuitively writing the engineer's idea. This greatly reduces errors in information written on the YOGO chart 200. Once the action identifiers 206a are correctly written on the YOGO chart 200, the numerical values included in the numerical tables 206b may simply be corrected without changing the YOGO chart 200. This allows easy creation of the YOGO chart 200 including the element actions of actuators correctly written.

The control apparatus 100 for the automated manufacturing machine according to the present embodiment has been described. However, the present invention is not limited to the above embodiment and may be practiced in various manners without departing from the spirit and scope of the invention.

For example, the control apparatus 100 for the automated manufacturing machine according to the above embodiment has the functions of creating the YOGO chart 200 and generating the control program from the YOGO chart 200 (corresponding to the YOGO chart creator 101, the element action storage 102, the YOGO chart reader 103, the YOGO chart analyzer 104, and the control program generator 105 in FIG. 13), as well as the function of performing control in accordance with the control program (corresponding to the control unit 106 in FIG. 13). However, these functions may be performed by multiple devices each responsible for part of the functions. Such devices may be combined to function as the control apparatus 100 for the automated manufacturing machine as a whole.

Figure 20:
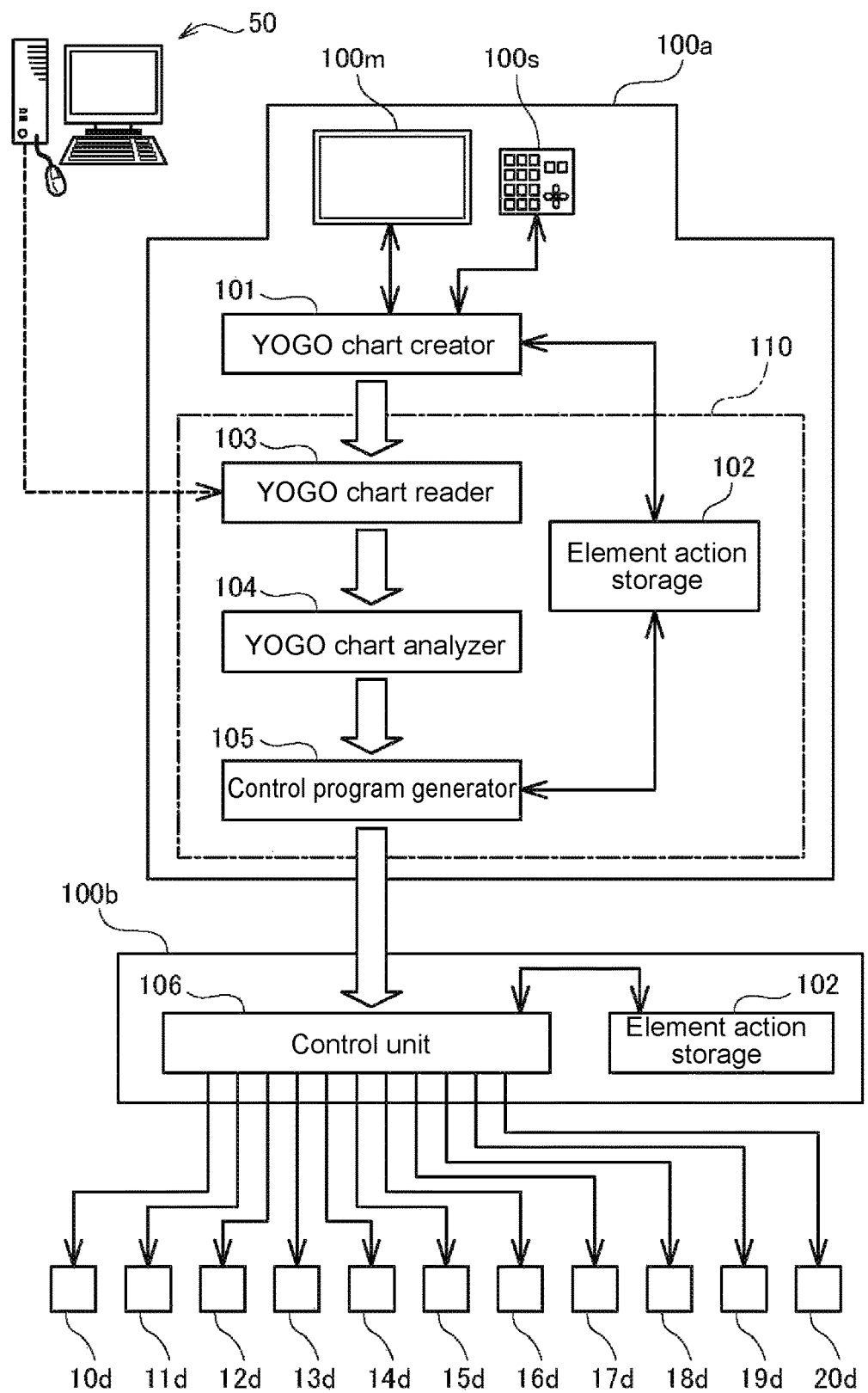
FIG. 20 is a diagram of a control apparatus 100 for an automated manufacturing machine according to a modification including a YOGO chart processor 100a and a controller 100b.

As shown in FIG. 20, for example, the control apparatus 100 for the automated manufacturing machine may include a YOGO chart processor 100a and a controller 100b. The YOGO chart processor 100a may incorporate a series of functions from the creation of the YOGO chart 200 to the generation of the control program (specifically, the YOGO chart creator 101, the element action storage 102, the YOGO chart reader 103, the YOGO chart analyzer 104, and the control program generator 105). The controller 100b may incorporate the function of performing control in accordance with the control program (specifically, the control unit 106 and a program element storage 107).

The YOGO chart processor 100a can be installed in an office room to be used to create the YOGO chart 200 and generate the control program. The controller 100b can be installed near the automated manufacturing machine 1 to be used to read the generated control program to cause the automated manufacturing machine 1 to operate. In the example of FIG. 20, the YOGO chart processor 100a corresponds to a control program generation apparatus in one or more aspects of the present invention.

The numerical tables 206b illustrated in FIGS. 7A to 9F may additionally include various fields as appropriate. For example, the numerical tables 206b may include an action wait time field in addition to the fields illustrated in FIGS. 7A to 9F. The action wait time field is described below. As described above, the YOGO chart 200 includes element actions identified by the action identifiers 206a combined with the numerical tables 206b to define the actuators to act and the timing of actions. More specifically, the element action written at the coordinate position (N, M) on the YOGO chart 200 indicates the actuator with the actuator number N to perform the element action at the time with the subperiod number M. For the numerical table 206b including the action wait time field, the actuator starts acting not immediately at the start of the subperiod with the subperiod number M but after the elapse of time set for the action wait time.

FIGS. 21A and 21B are example numerical tables 206b each combined with the action identifier 206a (Ω-AA) and including the action wait time field. The numerical table 206b illustrated in FIG. 21A includes 5 seconds in the action wait time field. The combined action identifier 206a (Ω-AA) indicates the opening or closing motion of the chuck. The numerical table 206b of FIG. 21A combined with the action identifier 206a (Ω-AA) can indicate the action of closing the chuck after the elapse of 5 seconds. The numerical table 206b can include 0 seconds in the action wait time field as illustrated in FIG. 21B. This indicates the action of closing the chuck immediately.

In the above embodiment, the YOGO chart 200 describes each element action 206 using the action identifier 206a and the numerical table 206b. For generating the control program from the YOGO chart 200, the action identifiers 206a are converted into program elements, the numerical values stored in the fields in the numerical tables 206b are read, and the numerical values are set as the arguments for the program elements. Once the YOGO chart 200 is created, the actions of actuators can be adjusted simply by changing the details of the numerical tables 206b (without changing the YOGO chart 200). For program elements using not so many (e.g., 10 or fewer) arguments, multiple numerical parameters may be used instead of the numerical tables 206b. In this case, each element action 206 is described using the action identifier 206a and multiple numerical parameters.

FIGS. 22A and 22B are diagrams showing example element actions 206 on the YOGO chart 200 each described using the action identifier 206a and multiple numerical parameters 206c. FIG. 22A shows the element action 206 described using the action identifier 206a (Ω-AB) and the numerical parameters 206c (θ1, RV1, and RT1). As described above, the action identifier 206a (Ω-AB) indicates the rotation motion to be performed by an actuator combining an AC servomotor and a reducer (refer to FIG. 6). The rotation angle, the rotation speed, and torque are thus to be set as arguments (refer to FIGS. 8A and 8B). In the example of FIG. 22A, three numerical parameters 206c are set for the arguments. In FIG. 22A, the numerical parameter 206c (θ1) indicates the rotation angle. The numerical parameter 206c (RV1) indicates the rotation speed. The numerical parameter 206c (RT1) indicates the torque. The numerical values of the numerical parameters 206c (θ1, RV1, and RT1) are prestored in the element action storage 102.

FIG. 22B shows the element action 206 described using the action identifier 206a (Ω-AA) and the numerical parameters 206c (OV1 and OF1). As described above, the action identifier 206a (Ω-AA) indicates the opening or closing motion to be performed by an actuator combining an AC servomotor and a chuck unit (refer to FIG. 6). The opening-closing speed and the opening-closing load are thus to be set as arguments (refer to FIGS. 7A and 7B). In the example of FIG. 22B, the numerical parameter 206c (OV1) indicates the opening-closing speed, and the numerical parameter 206c (OF1) indicates the opening-closing load. The numerical parameters 206c (OV1 and OF1) are prestored in the element action storage 102.

In this manner as well, each element action 206 can be described on the YOGO chart 200 using the action identifier 206a and the multiple numerical parameters 206c. Once the YOGO chart 200 is created, the actions of actuators can be adjusted simply by changing the numerical values stored in the element action storage 102 without changing the YOGO chart 200.

The element actions 206 may be written on the YOGO chart 200 with the method using the action identifiers 206a and the numerical tables 206b in combination with the method using the action identifiers 206a and the multiple numerical parameters 206c.

The automated manufacturing machine 1 may be controlled to maximize the manufacturing efficiency (production per hour). In this case, the numerical table 206b or the numerical parameters 206c may include the position at which a subsequent element action 206 is permitted to start before the completion of an element action 206.

For the YOGO chart 200 of FIG. 5, for example, the actuator 13 alone acts in the subperiod with the subperiod number 1. The actuator 11 alone acts in the subperiod with the subperiod number 2. The actuator 11 is thus to start acting upon completion of the action of the actuator 13. However, the actuator 11 may start acting before the actuator 13 completes its action. This allows the actuator 11 to complete its action earlier.

For the YOGO chart 200 of FIG. 5, for example, the actuator 13 has the element action 206 including the action identifier 206a (Ω-AC) and the numerical table 206b (AC-B11). The action identifier 206a (Ω-AC) indicates the forward or backward motion to be performed by the actuator (refer to FIG. 6). In the example of FIG. 9C, the numerical table 206b (AC-B11) includes (+)46 mm as the movement distance for the forward or backward motion, indicating that the subsequent actuator 11 starts acting when the actuator 13 moves forward by 46 mm. However, the subsequent actuator 11 may start acting before the actuator 13 moves by a movement distance of 46 mm (for example, a movement distance of 43 mm). This allows the actuator 11 to complete its action earlier. To achieve this, the above numerical table 206b or numerical parameters 206c may include the position at which the subsequent element action is permitted to start (hereafter, a subsequent-action permission position).

Figures 23A, 23B:
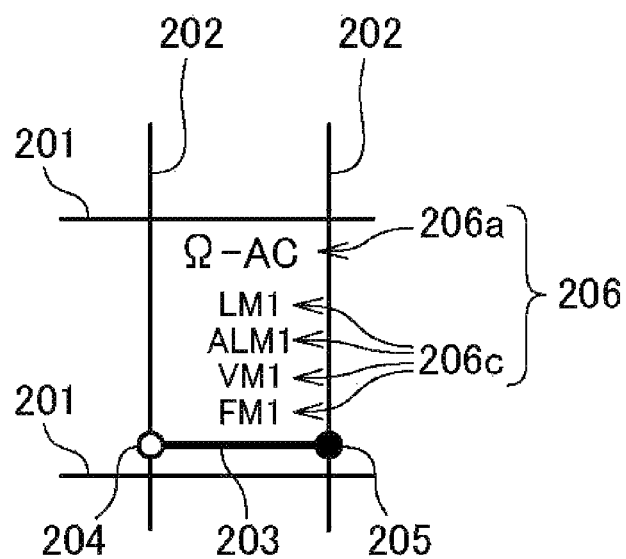
FIG. 23A is an example numerical table 206b including a subsequent-action permission position.
FIG. 23B is a diagram showing example numerical parameters 206c including a subsequent-action permission position.

FIG. 23A is an example numerical table 206b including the subsequent-action permission position. FIG. 23B is a diagram showing example numerical parameters 206c including the subsequent-action permission position. FIG. 23A is a numerical table 206b including the subsequent-action permission position field. FIG. 23B is a diagram showing a numerical parameter 206c as the subsequent-action permission position.

As compared with the numerical table 206b illustrated in FIG. 9C, the numerical table 206b illustrated in FIG. 23A additionally includes the subsequent-action permission position field with a numerical value of −5 mm. The numerical table 206b includes the movement distance field with a numerical value of 46 mm. These numerical values indicate that a subsequent actuator is permitted to start its element action 206 in response to the movement distance reaching 41 mm (=46−5).

In the example of FIG. 23B, the multiple numerical parameters 206c set for the action identifier 206a (Ω-AC) include the subsequent-action permission position. More specifically, the numerical parameter 206c (LM1) indicates the movement distance. The numerical parameter 206c (ALM1) indicates the subsequent-action permission position. The element action 206 indicated by the action identifier 206a (Ω-AC) continues until the movement distance reaches the numerical value set for the numerical parameter 206c (LM1). However, the subsequent element action 206 is permitted to start in response to the movement distance reaching the numerical value set for the numerical parameter 206c (ALM1) (=LM1−ALM1).

The actuator 13 set for the subperiod with the subperiod number 1 has been described with reference to the YOGO chart 200 of FIG. 5. The actuator 13 alone is set for the subperiod with the subperiod number 1. In response to the movement distance of the actuator 13 reaching the subsequent-action permission position, the actuator 11 starts its element action 206 for the subsequent subperiod (specifically, the subperiod with the subperiod number 2). For the element action 206 of the actuator 11, the subsequent-action permission position may be set in the same manner. In response to the movement distance of the actuator 11 (specifically, the rotation angle of the actuator 11 that performs the rotation motion) reaching the subsequent-action permission position, the actuator 12 starts its element action 206 for the subsequent subperiod.

The subperiod with the subperiod number 4 includes the element action 206 of the actuator 10 alone. The subsequent subperiod (specifically, the subperiod with the subperiod number 5) includes the element actions 206 of the three actuators 14 to 16. In response to the movement distance of the actuator 10 reaching the subsequent-action permission position, the three actuators 14 to 16 start their element actions 206. The actuators 14 to 16 are sequence-controlled without any specification of parameters such as the movement distance or the rotation angle. The actuators 14 to 16 thus have no subsequent-action permission position.

The subperiod with the subperiod number 7 includes the element action 206 of the actuator 12 alone. The previous subperiod (specifically, the subperiod with the subperiod number 6) includes the element actions 206 of the two actuators 10 and 17. In response to the movement distances of the actuators 10 and 17 both reaching the subsequent-action permission position, the actuator 12 starts its element action 206.

The subsequent-action permission position can thus be set for each servo-controlled actuator to accelerate completion of the operation of the automated manufacturing machine 1, thus increasing the manufacturing efficiency. The subsequent-action permission position may be set to a numerical value 0 initially. The numerical table 206b or the numerical parameters 206c may be corrected to gradually increase the numerical value of the subsequent-action permission position through the operation of the automated manufacturing machine 1. The subsequent-action permission position can thus be set easily and appropriately.

REFERENCE SIGNS LIST 1 automated manufacturing machine
2 rail
3 conveyor unit
3a holder shaft
3b chuck
4 machining unit
10 to 20 actuator
10d to 20d driver circuit
50 computer
100 control apparatus for automated manufacturing machine
100a YOGO chart processor
100b controller 100m monitor screen
100s operation button
102 element action storage
105 control program generator
106 control unit
107 program element storage
110 control program generation apparatus
201 separation line
202 trigger line
203 action line
204 start point
205 end point
206 element action
206a action identifier
206b numerical table
206c numerical parameter

The invention claimed is:

1. A control program generation apparatus for generating a control program for an automated manufacturing machine including a plurality of actuators, the apparatus comprising:
   an element action storage storing a plurality of element actions each indicating an action with an inherent degree of freedom of a corresponding actuator of the plurality of actuators, the plurality of element actions being associated with a plurality of program elements to perform the plurality of element actions;
   an action chart reader configured to read an action chart describing an operation of the automated manufacturing machine, the action chart including a plurality of subperiods into which an operation period from a start to an end of the operation of the automated manufacturing machine is divided, the action chart including the plurality of element actions included in the operation of the automated manufacturing machine, the plurality of element actions being assigned to the plurality of subperiods; and
   a control program generator configured to generate the control program to cause the automated manufacturing machine to operate by combining together, in an order of the plurality of subperiods on the action chart, the plurality of program elements for the plurality of element actions assigned to the plurality of subperiods on the action chart,
   wherein each of the plurality of element actions includes an action identifier and a numerical identifier, the action identifier includes qualitative information about the element action without numerical quantitative information about the element action, the numerical identifier includes numerical quantitative information about the element action, and the element action storage stores the plurality of program elements each corresponding to the action identifier of a corresponding element action of the plurality of element actions and stores a numerical table corresponding to the numerical identifier or a plurality of numerical parameters corresponding to the numerical identifier,
   the action chart reader reads the action chart describing the plurality of element actions each including the action identifier and the numerical table or the plurality of numerical parameters, and
   the control program generator sets a numerical value for each of the plurality of program elements in accordance with the numerical table or the plurality of numerical parameters described with the action identifier corresponding to the program element, and combines the plurality of program elements together.

2. The control program generation apparatus according to claim 1, wherein
   the numerical table or the plurality of numerical parameters stored in the element action storage include a numerical value indicating at least one of a displacement, an action speed, or an action load for an element action of the plurality of element actions.

3. The control program generation apparatus according to claim 1, wherein
   the element action storage stores a lookup table to be referred to when the numerical table includes no numerical value.

4. The control program generation apparatus according to any one of claim 1, wherein
   the element action storage stores the numerical table or the plurality of numerical parameters including an action wait time to wait before a start of an element action of the plurality of element actions.

5. A control program generation method for generating, with a computer, a control program for an automated manufacturing machine including a plurality of actuators, the method comprising:
   reading an action chart describing an operation of the automated manufacturing machine, the action chart including a plurality of subperiods into which an operation period from a start to an end of the operation of the automated manufacturing machine is divided, the action chart including a plurality of element actions included in the operation of the automated manufacturing machine, each of the plurality of element actions indicating an action with an inherent degree of freedom of a corresponding actuator of the plurality of actuators, the plurality of element actions being assigned to the plurality of subperiods;
   analyzing the action chart to extract, from the action chart, the plurality of element actions and the plurality of subperiods assigned with the plurality of element actions; and
   generating the control program to cause the automated manufacturing machine to operate by combining together, in an order of the plurality of subperiods assigned with the plurality of element actions on the action chart, a plurality of program elements to perform the plurality of element actions,
   wherein the reading the action chart includes reading the action chart describing the plurality of element actions each including an action identifier and a numerical table or a plurality of numerical parameters, the action identifier includes qualitative information about the element action without numerical quantitative information about the element action, and the numerical table or the plurality of numerical parameters include numerical quantitative information about the element action, and
   the generating the control program includes referring to a stored correspondence between the action identifier of each of the plurality of element actions and a program element of the plurality of program elements to perform the action identifier, converting the action identifier into the program element, setting a numerical value for each of the plurality of program elements in accordance with the numerical table or the plurality of numerical parameters described with the action identifier, and combining together the plurality of program elements in an order of the plurality of subperiods.

6. A non-transitory computer-readable storage medium storing a program for causing a computer to implement a method for generating a control program for an automated manufacturing machine including a plurality of actuators, the program causing the computer to perform operations comprising:

reading an action chart describing an operation of the automated manufacturing machine, the action chart including a plurality of subperiods into which an operation period from a start to an end of the operation of the automated manufacturing machine is divided, the action chart including a plurality of element actions included in the operation of the automated manufacturing machine, each of the plurality of element actions indicating an action with an inherent degree of freedom of a corresponding actuator of the plurality of actuators, the plurality of element actions being assigned to the plurality of subperiods;

analyzing the action chart to extract, from the action chart, the plurality of element actions and the plurality of subperiods assigned with the plurality of element actions; and generating the control program to cause the automated manufacturing machine to operate by combining together, in an order of the plurality of subperiods assigned with the plurality of element actions on the action chart, a plurality of program elements to perform the plurality of element actions, wherein the reading the action chart includes reading the action chart describing the plurality of element actions each including an action identifier and a numerical table or a plurality of numerical parameters, the action identifier includes qualitative information about the element action without numerical quantitative information about the element action, and the numerical table or the plurality of numerical parameters include numerical quantitative information about the element action, and the generating the control program includes referring to a stored correspondence between the action identifier of each of the plurality of element actions and a program element of the plurality of program elements to perform the action identifier, converting the action identifier into the program element, setting a numerical value for each of the plurality of program elements in accordance with the numerical table or the plurality of numerical parameters described with the action identifier, and combining together the plurality of program elements in an order of the plurality of subperiods.

\* \* \* \* \*